(12) United States Patent
Stephan et al.

(10) Patent No.: US 7,923,698 B2
(45) Date of Patent: Apr. 12, 2011

(54) NEUTRON DETECTOR

(75) Inventors: Andrew C. Stephan, Knoxville, TN (US); Vincent D. Jardret, Powell, TN (US); Roger A. Kisner, Knoxville, TN (US)

(73) Assignees: Material Innovations, Inc., Knoxville, TN (US); UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 12/586,949

(22) Filed: Sep. 30, 2009

(65) Prior Publication Data

US 2010/0155617 A1 Jun. 24, 2010

Related U.S. Application Data

(63) Continuation-in-part of application No. 11/820,261, filed on Jun. 19, 2007, now abandoned.

(51) Int. Cl.
*G01T 3/00* (2006.01)
(52) U.S. Cl. .................................. 250/390.01
(58) Field of Classification Search . 250/390.01–390.12
See application file for complete search history.

(56) References Cited

U.S. PATENT DOCUMENTS

| | | | |
|---|---|---|---|
| 3,076,895 A | 2/1963 | Baldwin | |
| 4,330,710 A | 5/1982 | Tomassino et al. | |
| 4,623,508 A * | 11/1986 | Glesius et al. | 376/254 |
| 4,795,910 A | 1/1989 | Henderson et al. | |
| 5,029,262 A | 7/1991 | Schulte | |
| 5,036,202 A | 7/1991 | Schulte | |
| 5,036,546 A | 7/1991 | Gottesman et al. | |
| 5,073,715 A | 12/1991 | Chuiton et al. | |
| 5,078,951 A | 1/1992 | August, Jr. | |
| 5,204,527 A | 4/1993 | Buchanan | |
| 5,223,717 A | 6/1993 | Charpak | |
| 5,281,822 A | 1/1994 | Albrecht et al. | |
| 5,345,084 A | 9/1994 | Byrd | |
| 5,399,863 A | 3/1995 | Carron et al. | |
| 5,659,177 A | 8/1997 | Schulte | |
| 5,680,423 A | 10/1997 | Perkins et al. | |
| 5,693,947 A | 12/1997 | Morton | |
| 5,880,469 A | 3/1999 | Miller | |
| 5,940,460 A | 8/1999 | Seidel et al. | |
| 6,349,124 B1 | 2/2002 | Kronenberg et al. | |
| 6,423,972 B1 | 7/2002 | Fehrenbacher et al. | |
| 6,495,837 B2 | 12/2002 | Odom et al. | |
| 6,528,797 B1 | 3/2003 | Benke et al. | |
| 6,545,422 B1 | 4/2003 | George et al. | |

(Continued)

OTHER PUBLICATIONS

M. Kocsis, "The micro void neutron detector," Nuclear Instruments and Methods in Physics Research A, 529, pp. 354-357 (2004).

(Continued)

*Primary Examiner* — David P Porta
*Assistant Examiner* — Kiho Kim
(74) *Attorney, Agent, or Firm* — Robert J. Lauf

(57) ABSTRACT

A neutron detector comprises a gas-filled dielectric shell, preferably a glass balloon, having opposite electrodes. An electric field is established whereby ionizing particles may be detected via ionization and current flow in the gas, using a pulse height analyzer or other conventional means. The dielectric shell preferably has low gas permeability and a bulk resistivity in the range of $10^8$ to $10^{17}$ $\Omega$-m, and is preferably in the millimeter to centimeter size range. Multiple balloons may be arranged in parallel or may be individually addressable by the detector electronics.

20 Claims, 8 Drawing Sheets

U.S. PATENT DOCUMENTS

| | | |
|---|---|---|
| 6,566,657 B2 | 5/2003 | Odom et al. |
| 6,570,335 B1 | 5/2003 | George et al. |
| 6,594,332 B1 | 7/2003 | Kronenberg et al. |
| 6,612,889 B1 | 9/2003 | Green et al. |
| 6,614,867 B1 | 9/2003 | Kronenberg et al. |
| 6,620,012 B1 | 9/2003 | Johnson et al. |
| 6,625,243 B1 | 9/2003 | Kronenberg et al. |
| 6,639,210 B2 | 10/2003 | Odom et al. |
| 6,654,434 B1 | 11/2003 | Kronenberg et al. |
| 6,654,435 B1 | 11/2003 | Kronenberg et al. |
| 6,678,343 B1 | 1/2004 | Kronenberg et al. |
| 6,707,047 B2 | 3/2004 | Craig et al. |
| 6,714,616 B1 | 3/2004 | Kronenberg et al. |
| 6,717,999 B1 | 4/2004 | Kronenberg et al. |
| 6,727,505 B2 | 4/2004 | Benke et al. |
| 6,765,978 B1 | 7/2004 | Kronenberg et al. |
| 6,806,474 B2 | 10/2004 | McGregor et al. |
| 6,928,130 B1 | 8/2005 | Kronenberg et al. |
| 6,954,512 B1 | 10/2005 | Kronenberg et al. |
| 6,989,541 B2 | 1/2006 | Penn |
| 7,125,305 B2 | 10/2006 | Green et al. |
| 2004/0227098 A1 | 11/2004 | Tarabrine |
| 2005/0094758 A1 | 5/2005 | Ronaldson et al. |
| 2005/0161611 A1 | 7/2005 | Disdier et al. |
| 2005/0224719 A1 | 10/2005 | Polichar et al. |
| 2005/0258372 A1 | 11/2005 | McGregor et al. |
| 2006/0017000 A1 | 1/2006 | Martoff |
| 2006/0023828 A1 | 2/2006 | McGregor et al. |
| 2006/0043308 A1 | 3/2006 | McGregor et al. |
| 2006/0056573 A1 | 3/2006 | McGregor et al. |

OTHER PUBLICATIONS

G. F. Knoll, T. M. Henderson, W. J. Felmlee, "A Novel 3He Scintillation Detector," IEEE Transactions on Nuclear Science NS-34 (1), pp. 470-474 (1987).

G. F. Knoll, et al., "Light Collection in Scintillation Detector Composites for Neutron Detection," IEEE Transactions on Nuclear Science 35 (1), pp. 872-875 (1988).

M. Lorikyan, "The porous multiwire detector," Nuclear Instruments and Methods in Physics Research A 454 (1), pp. 257-259 (2000).

A. K. Drukier, J. Igalson, L. Sniadower, "A new detector of neutrons," Nuclear Instruments and Methods 154 (1), pp. 91-94 (1978).

F. D. Brooks, H. Klein, "Neutron spectrometry—historical review and present status," Nuclear Instruments and Methods in Physics Research A 476, pp. 1-11 (2002).

H. Toyokawa, et al, "A spherical neutron counter with an extended energy response for dosimetry," Radiation Protection Dosimetry 70 (1-4), pp. 365-370 (1997).

S. Yamaguchi et al., "Spherical neutron detector for space neutron measurement," Nuclear Instruments and Methods in Physics Research A 422, pp. 600-605 (1999).

R. A. Craig et al., "Performance of moderating neutron spectrometers that use scintillating fibers," Transactions of the American Nuclear Society, vol. 83, pp. 258-259 (2000).

D. G. Sarantites et al., "'Neutron shell:' a high efficiency array of neutron detectors . . . ," Nuclear Instr. and Meth. in Phys. Res. A 530, pp. 473-492 (2004).

A.S. Tremsin et al., "Very compact high performance microchannel plate thermal neutron collimators" IEEE Trans. Nucl. Sci. 51 [3], pp. 1020-1024 (2004).

D.P. Hutchinson et al., "Large area combined neutron/gamma detector for homeland security" Detector/Sensor R&T Conf., Gatlinburg, TN, Sep. 14-16, 2004.

S. Pozzi and K. Bekar, "Analysis of time correlation measurements with the active well coincidence counter" Symp. on Int'l Safeguards, Vienna, Austria Oct. 16-20, 2006.

H. Ing et al. "ROSPEC—a simple reliable high resolution neutron spectrometer" Radiation Protection Dosimetry 70 [1-4], pp. 273-278 (1997).

* cited by examiner

NEUTRON DETECTOR

CROSS-REFERENCE TO RELATED APPLICATIONS

This application is a Continuation-in-Part of U.S. patent application Ser. No. 11/820,261 entitled Neutron Detector, filed by the present inventors on Jun. 19, 2007; now abandoned it is also related to U.S. patent application Ser. No. 11/820,346 entitled Neutron Detector, filed by the present inventors on Jun. 19, 2007, now issued as U.S. Pat. No. 7,514,694; it further contains material disclosed in part in U.S. patent application Ser. No. 12/586,948 entitled Neutron Detector filed by the present inventors on even date herewith. The entire disclosures of each of the foregoing documents are incorporated herein in their entirety.

STATEMENT REGARDING FEDERALLY SPONSORED RESEARCH

This invention was made with Government support under Agreement No. HSHQPA-05-9-00047 awarded by the U.S. Department of Homeland Security to Material Innovations, Inc., and the Government has certain rights in this invention.

BACKGROUND OF THE INVENTION

1. Field of the Invention

The invention pertains to apparatus and methods for detecting neutrons and more particularly to neutron detectors having an ionizable gas contained in a dielectric capsule.

2. Description of Related Art

Kocsis has published several papers describing a particle detector using a syntactic foam comprising gas-filled glass micro bubbles embedded in epoxy and held in an external electric field [see, e.g., M. Kocsis, The micro void neutron detector, Nucl. Instr. and Meth. in Physics Res. A, 529, 354-7, 2004]. In operation the applied electric field is held below the dielectric breakdown threshold. When ionizing radiation is present, free electrons are liberated within the gas volume and are multiplied by further collisions according to well-understood physical principles. As the charges reach the opposite surfaces of the void, an induced electric pulse is detected by the external electrodes. Kocsis notes that the detector may be sensitive to various types of ionizing radiation such as X-rays and that sensitivity to neutrons may be enhanced by filling the bubbles with $^3$He.

The detector taught by Kocsis was shown to detect radiation from a $^{90}$Sr source as well as cold neutrons. However, it has several shortcomings that limit its usefulness for many applications: First, the size of the micro bubbles was too small to capture all the energy of the ionizing particle, as stated on p. 356 of the aforementioned paper: "There is no full energy deposition in the void and the signal is generated mainly by the void discharge . . . . Therefore the amplitude spectrum is similar for different ionizing particles. The main difference is in the efficiency of triggering the discharge in the voids due to different specific ionization of the particles." In other words, the detector is operated substantially in the Geiger-Mueller mode. A second shortcoming is that, although Kocsis suggests using $^3$He as the void gas, the size and composition of the glass micro bubbles (1.5 μm wall thickness, borosilicate glass) would be generally unsuitable for containing He, because it would lose roughly 50% of the $^3$He pressure within three days. A third shortcoming is that the large number of layers of micro bubbles between one pair of electrodes limits the output signal.

Henderson et al. disclose neutron detectors based on $^3$He-filled glass shells embedded in a matrix of scintillating material with event detection using a photomultiplier tube (PMT). Two publications appeared in the scientific literature [G. F. Knoll, T. M. Henderson, W. J. Felmlee, "A Novel $^3$He Scintillation Detector," IEEE Transactions on Nuclear Science NS-34 [1], pp. 470-474 (1987); G. F. Knoll, T. F. Knoll, T. M. Henderson, "Light Collection in Scintillation Detector Composites for Neutron Detection," IEEE Transactions on Nuclear Science 35 [1], pp. 872-875 (1988)] and a patent was granted for this approach [Henderson et al., U.S. Pat. No. 4,795,910, "Radiation-detection/scintillator composite and method of manufacture"]. The Henderson device was capable of improved $^3$He gas retention as compared to the Kocsis device, but would still lose the majority of its $^3$He gas fill in less than a year, a problem for long-term (practical) use in the field. Henderson et al make a number of suggestions for improving the performance of their device; however, their suggestions relate to their particular detection methodology.

Lorikyan has disclosed the use of a porous dielectric material for alpha, beta (electron), and neutron detection ["The porous multiwire detector," M. Lorikyan, Nuclear Instruments and Methods in Physics Research A, 454, Issue 1, 257-59 (2000)]. In this device, alphas and betas interacting in the device yield electrons in the walls of the porous material that then travel through the pores, striking the walls of the pores as they go, thereby yielding secondary electrons and producing gas gain.

A number of patents granted to George et al. and others at SAIC disclose a light-emitting panel and various components and manufacturing methods connected therewith [see, for example, U.S. Pat. Nos. 6,545,422; 6,570,335; 6,612,889; 6,620,012; and 7,125,305]. Although these patents are directed primarily to light-emitting (flat-panel) displays, the disclosures mention the possibility of using them for particle detection: "Additionally, the light-emitting panel may be used for particle/photon detection. In this embodiment, the light-emitting panel is subjected to a potential that is just slightly below the write voltage required for ionization. When the device is subjected to outside energy at a specific position or location in the panel, that additional energy causes the plasma forming gas in the specific area to ionize, thereby providing a means of detecting outside energy." [Johnson et al., '012 Col. 4 lines 33-40]. Because these patents are directed to light-emitting panels, it appears that Johnson et al. contemplate detecting a particle event through similar optical emission, but it is not stated whether this is the case or whether it is contemplated to detect the event by sensing current flow between adjacent electrodes. In any case, these patents contemplate operating the panel at "a potential that is just slightly below the write voltage required for ionization." This is equivalent to operation in the Geiger-Mueller mode, where the pulse amplitude is independent of particle energy and thus does not provide information on the type or energy of the incoming particle.

Drukier et al have described a neutron detector based on superconducting grains embedded in a dielectric matrix material. In essence, neutron energy deposition in a superconducting grain heats the grain and changes its properties. [Drukier, A. K., Igalson, J., and Sniadower, L., "A new detector of neutrons," Nuclear Instruments and Methods, 154 [1], pp. 91-4 (1978)]. Superconducting grains are set, read out, and reset using an externally applied magnetic field. Neutron-gamma discrimination is done on the basis of a certain minimum energy deposition in a superconducting grain being necessary to change the state of the superconducting grain. Because of this characteristic, the Drukier device does not yield a direct electronic pulse that can be evaluated using pulse height analysis (pulse height discrimination) for neutron-gamma separation.

Tomassino et al. in U.S. Pat. No. 4,330,710 describe a neutron dosimeter whose body is formed from a transparent dielectric material and in which a second material is contained inside, with an optical readout method being used. The Tomassino device does not provide real-time detection (i.e., it measures integrated neutron exposure and does not indicate individual neutrons).

McGregor et al in US Patent Application 2006/0043308 disclose an array of micro neutron detectors based on components (usually two substrates with cavities in them) that are fit together in a gaseous environment to form a gas-filled pocket that acts as a neutron detector. Neutron sensitivity is achieved by having a neutron reactive material (in other words, neutron target material) present in the detector, such as a thin layer (e.g. $^{10}B$, $^6Li$, $^{235}U$) coating one of the interior surfaces of the detector. As is described in the disclosure, when assembled together, a detector consists of an outer body of insulating material with electrode wires entering the detector through holes in the insulating outer body and connecting to electrodes inside the outer body; in other words, electrodes are internal, rather than external. McGregor et al disclose additional variations and uses of this concept in US Patent Applications 2006/0023828 and 2006/0056573.

OBJECTS AND ADVANTAGES

Objects of the present invention include the following: providing a more efficient (sensitive) neutron detector, both on an absolute and a per-volume basis; providing a neutron detector that more effectively discriminates neutrons from other types of ionizing radiation; providing a gas-filled neutron detector with improved signal characteristics; providing a gas-filled neutron detector capable of filling with $^3$He and further capable of retaining the $^3$He for an effective period of time; providing a gas-filled neutron detector capable of filling with other neutron-reactive gases such as hydrogen; providing a gas-filled neutron detector with reduced voltage and power requirements; providing a gas-filled neutron detector that is easier and less expensive to manufacture; providing a gas-filled neutron detector of enhanced field-ruggedness; providing a gas-filled neutron detector that can be filled with multiple types of gases; and providing a gas-filled neutron detector that can be formed into many different shapes and sizes. These and other objects and advantages of the invention will become apparent from consideration of the following specification, read in conjunction with the drawings.

SUMMARY OF THE INVENTION

According to one aspect of the invention an apparatus for detecting neutrons comprises: a hollow dielectric body having a bulk resistivity in the range from about $10^8$ to about $10^{17}$ Ω-m, the body containing an interior volume of gas capable of at least partial ionization by a neutron; two electrodes in contact respectively with opposite sides of the dielectric body, the electrodes configured on the outside of the dielectric body to create an electric field across the gas volume, where the peak voltage drop across the interior volume of the sensor is at least 70% of the bias voltage applied between the electrodes, so that an electrical pulse may be detectable by the electrodes when an ionization event occurs within the interior volume; and, a detection circuit connected to the electrodes, the detection circuit capable of detecting said electrical pulse.

According to another aspect of the invention, an apparatus for detecting neutrons comprises: a substantially planar array of hollow dielectric shells, the shells filled with a gas capable of at least partial ionization by a neutron; electrodes disposed on opposite sides of the planar array in electrical contact with the hollow dielectric shells whereby an electrical pulse may be collected in response to the passage of the neutron; and, a detection circuit connected to the electrodes, the detection circuit capable of detecting the electrical pulse.

According to another aspect of the invention, a method of making a neutron detector comprising the steps of: formulating a glass composition having a bulk resistivity in the range of $10^8$ to $10^{17}$ Ω-m and a gas permeability constant for helium at room temperature of less than $7.6 \times 10^{-11}$ cm$^3$/sec/cm$^2$/mm/cmHg; forming the glass into a hollow body having a selected interior dimension from about 0.1 to about 30 mm and a wall thickness from about 10 μm to about 5 mm, wherein the ratio of the wall thickness to the interior dimension is between 0.02 and 0.2; filling the body with a gas composition at a selected pressure, the gas composition capable of at least partial ionization by a neutron; sealing the body to retain the gas; and, applying two electrodes on opposite sides, respectively, of the hollow glass body, the electrodes configured to apply a selected bias voltage to the hollow glass body, wherein the peak voltage drop across the selected interior dimension of said hollow body is at least 70% of the selected bias voltage.

According to another aspect of the invention, an apparatus for detecting neutrons comprises: a plurality of neutron sensors comprising hollow dielectric bodies having a bulk resistivity in the range from about $10^8$ to about $10^{17}$ Ω-m, the dielectric bodies filled to a selected pressure with a gas capable of at least partial ionization by a neutron; electrodes disposed on the external surfaces of the dielectric bodies and configured to establish an electric field within the interior volume of the dielectric bodies, where the peak voltage drop across the interior volume of each of the sensors is at least 70% of the bias voltage applied between the electrodes, so that an electrical pulse may be collected in response to the ionization produced by an interaction of the neutron; a volume of moderator material in which the neutron sensors are placed, the moderator material having a front surface, wherein some of the neutron sensors are placed closer to the front surface than are others; and a detection circuit connected to the electrodes, the detection circuit capable of detecting the electrical pulse.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore non-limiting embodiments illustrated in the drawing figures, wherein like numerals (if they occur in more than one view) designate the same elements. The features in the drawings are not necessarily drawn to scale.

DETAILED DESCRIPTION OF THE INVENTION

Figure 1:
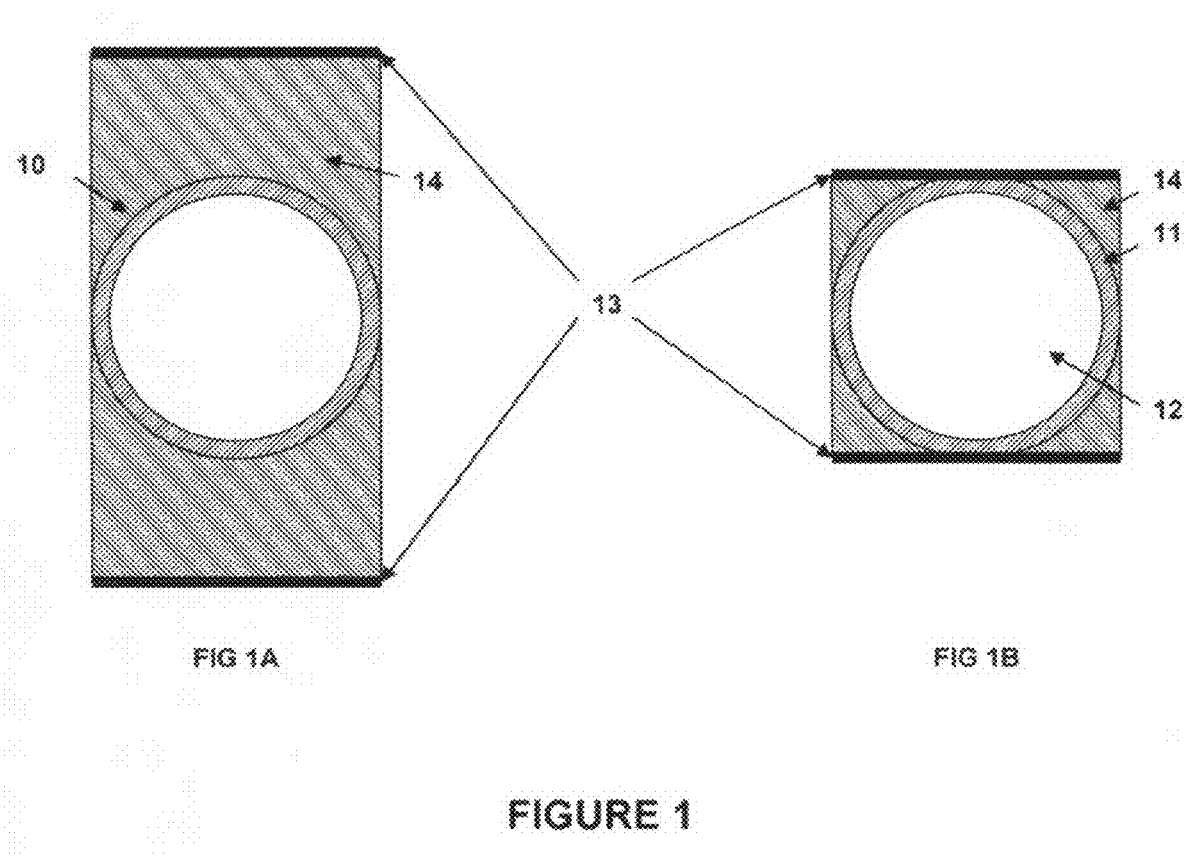
FIG. 1 is a schematic diagram in cross-section of two configurations of a gas-filled dielectric balloon and external electrodes.

The present invention is a neutron detector that incorporates one or more gas-filled dielectric sensors. Physically, each gas-filled dielectric sensor consists of a hollow body or capsule comprising a dielectric material that encapsulates a volume of gas. Neutron target material (atoms that react with neutrons to release energetic particles) is placed in or nearby a sensor such that neutron interactions in the neutron target material are capable of producing one or more energetic particles that travel into or through the gas inside the sensor and deposit energy in the form of ionizations in the gas. An electric field is applied to a sensor; under the influence of this electric field, the ionizations move through the gas volume until stopped by the interior surface of the sensor. (Some ionizations may be lost to other effects such as electron-ion recombination and electron capture by electronegative species; in general, this is undesirable and is preferably kept at a minimal level.) As the electrons and ions move through the sensor under the influence of the electric field, they produce a current pulse on the electrodes. This current pulse can be detected and measured using classic radiation detection electronics, such as a preamplifier, amplifier, and computer-based multichannel analyzer (MCA) card and software or a miniaturized electronics package for integration with the neutron detector into a complete self-contained device.

In order for a gas-filled dielectric neutron sensor to operate optimally, there are a number of aspects to its design and operation that may be considered. These include the following.

First, the combination of sensor size and gas density must be large enough such that energetic particles from neutron interactions are capable of depositing enough energy in the sensor gas to produce a charge pulse that can be detected, measured, and distinguished from background noise when running in a sub-Geiger-Mueller (sub-GM) mode (i.e. ionization, proportional, or limited proportionality mode). Simultaneously, the combination of sensor size and gas density should be low enough that energy deposition by electrons from gamma ray interactions is kept small enough that a high degree of neutron-gamma differentiation (for the purpose of counting neutrons without also counting false counts from gamma rays) is possible on the basis of pulse height analysis/pulse height discrimination. Taken together, these two requirements establish a general relationship between the gas density or gas pressure and the size of the sensor element.

Second, sensors must be operated in a sub-GM regime; either in ionization, proportionality, or limited proportionality mode. This is critical because operating in a GM mode causes the relationship between energy deposition in the sensor and pulse amplitude to be lost, preventing neutron pulses from being distinguished from gamma pulses on the basis of pulse amplitude.

Third, the distribution of the electric field from the electrodes between the sensors and any other interstitial material must be such that the potential voltage drop across an individual sensor (and in particular, across the gas-filled cavity inside the sensor) is a substantial fraction of the total drop in potential voltage between the electrodes. This is necessary because the measured neutron pulse amplitude from a sensor is proportional to the fraction of the potential voltage drop that occurs within the gas-filled cavity of the sensor; therefore, if this fraction is too small, the neutron pulse amplitudes will be too small to distinguish and count.

Fourth, the dielectric sensor capsule must be formed of a material that is capable of retaining the encapsulated gas for a useful period of time. This is especially important if the gas is used as the neutron target material is helium, as most materials are quite permeable to He and it is notoriously difficult to retain in a vessel.

Fifth, the dielectric sensor must have certain specific electrical properties. If the electrical resistivity of the dielectric material is too high (conductivity is too low), charges liberated in the gas by neutrons and other ionizing radiation will accumulate on the inside walls of the dielectric sensors without diffusing through the walls towards the electrodes or will do so only at a very low rate. In this case, the accumulated charge will produce a saturation effect as it builds up by concentrating the potential voltage drop between the electrodes in the sensor wall and interstitial material (if there is any present) and extinguishing the electric field inside the sensor, thereby preventing the sensor from generating neutron pulses. Saturation need not be complete to represent a problem; neutron pulse amplitude will decline in proportion to the electric field strength in the dielectric sensor gas and sensor performance will be substantially degraded well before the neutron pulses disappear completely. On the other hand, if the electrical resistivity of the dielectric material is too low (conductivity is too high), this will lead to a high leakage current and a different set of problems will arise. First, power consumption of the detector will be much higher than necessary (although this may not prevent the device from successfully operating). Secondly and more importantly, greater leakage current will increase the level of electronic noise. This means that if leakage current is too high, the sensors can lose their ability to detect neutrons and distinguish them from noise. These effects impose a range of electrical resistivity on the dielectric material outside of which the dielectric neutron sensors will not operate optimally.

In addition, skilled artisans will appreciate that additional aspects of the design and operation of the dielectric sensors may be important for optimal operation, but not strictly necessary in order to usefully detect neutrons. One example is avoiding or minimizing gamma-induced electron crosstalk between multiple dielectric sensors, as such crosstalk will increase the amplitude of the gamma pulses and degrade the ability to distinguish neutrons from gamma rays.

In its most general form, the invention comprises a sealed, hollow dielectric body, typically glass, containing a gas that is ionizable by selected forms of radiation. An electric field is applied to the dielectric body, preferably by electrodes that are disposed on or adjacent to opposite sides of the dielectric body. The dielectric material preferably has a bulk resistivity selected to allow the detector to return to equilibrium after a detection event. The detector is preferably operated in an ionization, proportional, or limited proportional mode (as opposed to Geiger-Mueller mode). The signal created by an incoming neutron is preferably distinguished from other sources (noise, gamma rays, etc.) by pulse height analysis/pulse height discrimination (e.g, using a lower level discriminator, or LLD). As will be shown in the several examples that follow, this arrangement provides several clear performance advantages over previously reported neutron detectors.

The invention may be carried out in many different geometrical arrangements that preserve its fundamental characteristics. For simplicity, in the examples that follow the dielectric body is shown as a sphere; however it will be appreciated that any suitable shape may be used without fundamentally altering the physical principles on which the detector operates.

Methods of Obtaining Neutron Sensitivity: Producing Energy Deposition in a Sensor In many applications, such as detection of fissile material for national defense and/or counter-terrorism purposes, it is often desirable to maximize the likelihood of detecting a neutron that enters the detector (it is normally the case for neutron detectors that the probability of detecting such a neutron is substantially less than one, particularly for fast neutrons such as from fissile material), within the context of other constraints such as detector size, weight, and cost. For a detector consisting of a number of dielectric sensors, one method of accomplishing this is to maximize the sensitivity of individual dielectric sensors for neutron detection.

Dielectric sensors can detect neutrons in several different ways. In each case, the common element is that a neutron interacts with an atom to produce an energetic particle that creates ionizations in the dielectric sensor; the ionizations then lead to an electronic signal being produced, thereby indicating the presence of the neutron.

To enhance the likelihood of successfully detecting a neutron, one may include atoms or isotopes ("neutron target material") that have a propensity to interact with neutrons and produce energetic particles (reaction products) as a result. For example, H, $^4$He, Be, $^{11}$B, and C may all be used for neutron scattering, in which an energetic neutron (e.g. >10 keV) scatters off an atom, causing the atomic nucleus to recoil and then relinquish its energy in the form of ionizations in the material through which it moves. As another example, $^3$He, $^6$Li, and $^{10}$B may all be used to capture neutrons and upon capturing a neutron, produce energetic reaction products. As a final example, fissile or fissionable materials, such as $^{235}$U, may be used because of the energetic fission products they release.

A dielectric sensor can operate successfully with the neutron target material located in one or more of several locations. The neutron target material may be located in the gas inside the dielectric sensor; in this case the energetic particles are produced directly inside the dielectric sensor and create ionizations inside the sensor gas as they move through it and relinquish their energy. The neutron target material may be located in the wall of the sensor; in this case the energetic particles can reach the interior of the dielectric sensor and create ionizations in the gas by first moving through the sensor wall. If the neutron target material is located in the sensor wall (and assuming high neutron sensitivity is desirable), care should be taken to maximize the likelihood of such an energetic particle entering the interior of the dielectric sensor. Some of the methods for this include limiting the thickness and/or density of the sensor wall material in order to limit self-shielding effects, having the neutron target material be present in a higher concentration near the interior of the sensor wall and at a lower concentration near the exterior, and choosing neutron target materials whose reaction products are more likely to reach the interior of the sensor (for example, gadolinium produces electrons that have a substantially greater range than most heavy charged particles from neutron interactions). The neutron target material may also take the form of a layer of material sandwiched between the sensor gas and the sensor wall. One example of this would be to have a thin layer (e.g. 1-2 μm) of $^{10}$B neutron target material coating the inside of a hollow glass sphere. Reaction products from neutron capture events in the $^{10}$B would then produce a signal in the sensor when they traveled into the sensor gas and produced ionizations. A dielectric sensor may be compromised of multiple layers of material, such as an inner layer of neutron target material and an outer layer of structural material as just described, arranged in a variety of different ways. The neutron target material may also be located externally to the dielectric sensor; for example, the dielectric sensor may be coated with or surrounded by a neutron target material. Detection occurs when reaction products from the neutron target material enter the interior of the dielectric sensor and produce ionizations. When the neutron target material is located externally to the dielectric sensor, the dielectric sensor wall should be sufficiently thin to enable reaction products from the neutron target material to penetrate it and the geometric location and distribution of the neutron target material relative to the dielectric sensor(s) should be such that the probability of a reaction product entering the interior of the dielectric sensor is sufficient to yield a sufficient probability of detecting the neutron.

A variety of different gases may be included inside a sensor. If the gas is to include neutron target material, at least one type of neutron target isotope or element should be included in the gas. Isotopes and elements that are particularly suitable for this purpose include: the element boron (particularly the isotope $^{10}$B), such as in the form of $BF_3$ gas; the isotope $^3$He; the element uranium (particularly the isotope $^{235}$U), such as in the form of $UF_6$ gas; and the element hydrogen, a constituent of many different types of gases. Other isotopes and elements include Li, C, Gd, Th, and Pu. These are elements and isotopes that can produce one or more energetic reaction products, such as an alpha, fission product, recoil proton, or electron, as the result of a neutron interaction, such as a capture event or a scattering event. Some of these elements and isotopes are particularly sensitive to thermal neutrons, while others are sensitive to fast neutrons and insensitive to thermal neutrons. In general, elements and isotopes that can produce an energetic reaction product upon interaction with a neutron and are available in a gaseous form have the potential to be used for neutron detection. Of these, some are generally unsuitable for various reasons, such as high corrosiveness or high electron attachment coefficients. Issues related to gas selection will be familiar to those skilled in the art. In addition to a neutron target material, it is often desirable for a sensor to contain a stopping gas to enhance sensor gas density, thereby decreasing the range of the neutron reaction products in the sensor gas and increasing the energy deposition per unit of path length traveled. We have used both Ar and Ne gas for this purpose with good results. Other gases may include $CF_4$, methane, isobutane, other noble gases, and so forth. For sensors operated in a proportional or limited proportionality mode, quench gas may also be required to suppress effects from photons released by molecules excited by the electron avalanche. These issues are well known to those skilled in the art.

As described earlier, a variety of isotopes and elements may be used as neutron target material and located as a layer adjacent to the sensor wall, inside the sensor wall, or outside the sensor. The primary requirement is that the neutron target material be capable of generating an energetic neutron reaction product capable of reaching the interior of the sensor (the gas-filled region) and producing ionizations in the sensor gas. For neutron target material formed as a layer on the interior surface of the sensor between the gas and the dielectric body containing the gas, the neutron target material will need to have appropriate electrical characteristics such that it does not prevent correct operation of the sensor. For example, if the layer of neutron target material covers the entire inner surface of the sensor, the neutron target material should not be a conductor to avoid having a very high sensor leakage current and minimal electric field strength inside the sensor gas. On the other hand, if the resistivity of the neutron target material is extremely high, either the layer of neutron target material will need to be kept quite thin and/or the neutron target material will need to be limited as to the extent of its coverage of the interior surface of the sensor in order to prevent a situation in which the sensor takes an excessive length of time to equilibrate following a neutron detection event and charge build-up in the sensor causes the sensor to stop working correctly. Another important consideration in determining the thickness of the layer of neutron target material to be used is the range of the reaction products emitted by the neutron target material as a result of a neutron interaction; if the thickness of the neutron target material is sufficiently large compared to the range of the reaction products in the neutron target material, many of the neutron reaction products will be self-shielded by the neutron target material and fail to reach the sensor gas, thus not producing a detectable pulse. Neutron target material in the sensor wall can be an integral part of the wall (e.g. the wall could consist of glass that has one or more suitable neutron target materials as one of its constituents) or may be contained in it in layers, pockets, or similar structures. For example, a sensor wall could consist of the layers; a layer of dielectric material surrounded by a layer of neutron target material, surrounded by another layer of dielectric material. As another example, a sensor wall could consist of glass with pockets scattered throughout it, the pockets being filled with a neutron target material. As mentioned earlier, neutron target material can also be located outside the sensor. In this case, the neutron target material type, location relative to the sensor, and thickness and density of the sensor walls should be such that at least some of the neutron reaction products generated by the neutron target material and capable of penetrating the sensor into the sensor gas and producing ionizations in it. Additionally, the type and location of the neutron target material should be such that it does negatively affect the operation of the sensor, such as by adversely affecting the electric field strength or distribution inside the sensor or by unduly enhancing the leakage current of the sensor. Issues such as self-shielding and the effects of materials type and distribution are understood by those skilled in the art.

Elements and isotopes that may potentially be employed as neutron target materials include H, He (particularly $^3$He), Li (particularly $^6$Li), B (particularly $^{10}$B), C, Gd, Th, U (particularly $^{235}$U), and Pu. Molecules containing these elements and isotopes along with other atoms may also be suitable; some examples are LiF, $BF_3$, $B_2H_6$, $UF_6$, $CH_4$, $C_4H_{10}$, and $C_2H_6O$. Neither of these lists is intended to limit the scope of the invention, as those skilled in the art will appreciate that other elements and isotopes may be used as well.

Another consideration in designing a dielectric sensor is avoiding parasitic capture of neutrons; that is, neutron capture in regions or materials that do not contribute to neutron detection. For example, if the dielectric sensor wall material includes substantial amounts of isotopes that capture neutrons and the neutron capture events do not produce reaction products, many of the reaction products do not travel into the sensor (e.g. due to self-shielding if the sensor wall is too thick), or the reaction products do travel into the sensor but produce the wrong pulse characteristics (e.g. amplitude), neutron detection performance will be degraded. Examples of specific elements that are particularly likely to contribute to the problem of parasitic capture include, but are not limited to, Li, B, Cd, In, Sm, Eu, Gd, Dy, and Ir.

Methods of Obtaining Neutron Sensitivity and Rejecting Gamma Events: Obtaining Sufficient Energy Deposition in a Sensor For a neutron to produce a pulse in a dielectric sensor that is detectable as a neutron event, the pulse must meet two criteria: first, it must be of sufficient amplitude to be detected by the signal readout system; and second, it should be distinguishable with some degree of statistical confidence from a pulse produced by a gamma ray (photon). (In practice, complete separation of neutron and gamma pulses happens only rarely in the field of neutron detection; rather, there is a non-zero probability that a pulse counted as a neutron is in fact produced by a gamma ray.) In most instances, it is desirable to maximize the likelihood that a neutron pulse is of sufficient amplitude to be detected (and counted as a neutron) and to minimize the probability that a pulse ascribed to a neutron is in fact due to some other cause (usually a gamma ray). One of the deficiencies of the Kocsis device was that the gas density in the glass microspheres was too low; for a typical neutron capture event, less than one percent of the energy released by the event would deposited in the sensor gas. Along with other deficiencies in the design of the system, this precluded the Kocsis device from operating in a mode in which neutron pulses could be clearly distinguished from gamma pulses and electronic noise.

Energy deposition by a particle (e.g. a reaction product from a neutron interaction or an electron from a gamma interaction) in a dielectric sensor is a function of the particle type, its energy, the size of the dielectric sensor, the composition and density of the material in the dielectric sensor, and the trajectory of the particle. (Pulse amplitude is a function both of the energy deposition by a particle in the dielectric sensor and other characteristics such as the spatial distribution of the energy deposition within the interior of the sensor and any variation in sensor response with location, as a sensor may have a spatially-dependent non-uniform response.)

In general, the operating principle of a sensor is to make the sensor interior sufficiently large such that wall effects (edge effects) for the reaction products from the neutron-sensitive material used in the sensor are not so great as to prevent the neutron interactions from depositing enough energy to create a pulse that can be detected and ascribed to a neutron. Simultaneously, the wall effects (edge effects) for a gamma-produced electron should be sufficient to cause many of the electrons to exit the interior of the sensor before they are able to deposit their full energy, thus reducing their pulse amplitude and improving discrimination between neutron and gamma pulses on the basis of their respective amplitudes. This is possible because of the difference in energy deposition per unit path length of travel in a given material; neutron reaction products typically deposit 10 to 1000 times as much energy per unit of travel distance as do electrons, and conversely their ranges are 10 to 1000 times shorter if they have the same initial energy. This difference creates a window of sensor size and composition in which gamma sensitivity is minimized while neutron sensitivity is largely retained.

The following model calculations describe a single spherical dielectric micro void detector with electrodes directly applied to opposite sides of the dielectric.

Example 1

Theoretical results for one dielectric sensor detector balloon: Tables 1 and 2 below are derived from the results of theoretical calculations of wall effects (edge effects) for neutron reaction products and electrons from gammas. The tables define both the preferred range of parameters estimated to provide optimal performance and the range of parameters estimated to provide useful but non-optimal performance. As these values were derived from theoretical calculations, some lie beyond what is currently practical, given the existing state-of-the-art in materials science. For example, the current upper limit for gas pressure in small sensors is around $10^3$ atmospheres, while for very small sensor sizes (e.g. $10^{-3}$ cm) the theoretical maximum pressure is much higher.

TABLE 1

Suitable sensor sizes (interior diameter of a spherical dielectric sensor balloon) as a function of gas density.

| Gas Density (g/cc) | Minimum Size (cm) | Preferred Min (cm) | Preferred Max (cm) | Maximum Size (cm) |
|---|---|---|---|---|
| 1.00E−05 | 1.19E+01 | 2.38E+02 | 1.67E+03 | 1.07E+05 |
| 3.00E−05 | 3.97E+00 | 7.93E+01 | 5.57E+02 | 3.55E+04 |
| 1.00E−04 | 1.19E+00 | 2.38E+01 | 1.67E+02 | 1.07E+04 |
| 3.00E−04 | 3.97E−01 | 7.93E+00 | 5.57E+01 | 3.55E+03 |
| 1.00E−03 | 1.19E−01 | 2.38E+00 | 1.67E+01 | 1.07E+03 |
| 3.00E−03 | 3.97E−02 | 7.93E−01 | 5.57E+00 | 3.55E+02 |
| 1.00E−02 | 1.19E−02 | 2.38E−01 | 1.67E+00 | 1.07E+02 |
| 3.00E−02 | 3.97E−03 | 7.93E−02 | 5.57E−01 | 3.55E+01 |
| 1.00E−01 | 1.19E−03 | 2.38E−02 | 1.67E−01 | 1.07E+01 |
| 3.00E−01 | 3.97E−04 | 7.93E−03 | 5.57E−02 | 3.55E+00 |
| 1.00E+00 | 1.19E−04 | 2.38E−03 | 1.67E−02 | 1.07E+00 |
| 3.00E+00 | 3.97E−05 | 7.93E−04 | 5.57E−03 | 3.55E−01 |
| 1.00E+01 | 1.19E−05 | 2.38E−04 | 1.67E−03 | 1.07E−01 |

TABLE 2

Suitable sensor gas pressures as a function of sensor size (interior diameter of a spherical dielectric sensor balloon).

| Sensor Diameter (cm) | Minimum Pressure (atm) | Preferred Min (atm) | Preferred Max (atm) | Maximum Pressure (atm) |
|---|---|---|---|---|
| 1.00E−04 | 7.93E+01 | 8.29E+03 | 1.31E+06 | 8.40E+07 |
| 3.00E−04 | 2.64E+01 | 2.76E+03 | 4.38E+05 | 2.80E+07 |
| 1.00E−03 | 7.93E+00 | 8.29E+02 | 1.31E+05 | 8.40E+06 |
| 3.00E−03 | 2.64E+00 | 2.76E+02 | 4.38E+04 | 2.80E+06 |
| 1.00E−02 | 7.93E−01 | 8.29E+01 | 1.31E+04 | 8.40E+05 |
| 3.00E−02 | 2.64E−01 | 2.76E+01 | 4.38E+03 | 2.80E+05 |
| 1.00E−01 | 7.93E−02 | 8.29E+00 | 1.31E+03 | 8.40E+04 |
| 3.00E−01 | 2.64E−02 | 2.76E+00 | 4.38E+02 | 2.80E+04 |
| 1.00E+00 | 7.93E−03 | 8.29E−01 | 1.31E+02 | 8.40E+03 |
| 3.00E+00 | 2.64E−03 | 2.76E−01 | 4.38E+01 | 2.80E+03 |
| 1.00E+01 | 7.93E−04 | 8.29E−02 | 1.31E+01 | 8.40E+02 |
| 3.00E+01 | 2.64E−04 | 2.76E−02 | 4.38E+00 | 2.80E+02 |
| 1.00E+02 | 7.93E−05 | 8.29E−03 | 1.31E+00 | 8.40E+01 |

A detecting element was constructed based on the foregoing theoretical calculations as described in the following example.

Example 2

Applicants constructed a number of dielectric sensors consisting of gas-filled spherical balloons 10 (i.e. having an outer shell 11 and a hollow interior 12 filled with gas). Based on the foregoing calculations, the sensors had an outer diameter of 7 mm with 200 μm thick glass walls 11. (Although the sensors were made of glass, it will be appreciated that sensors can be made from a number of other ceramic or dielectric materials, provided they have the necessary electrical and mechanical characteristics.) The interior 12 of each sensor was filled with a gas mixture consisting of 3 atm $^3$He and 5 atm Ar. This combination of gas composition, gas pressure, and sensor size was sufficient for most $^3$He neutron capture events to deposit much or all of the energy released from the neutron capture reaction (in the form of energetic reaction products) in the sensor gas. Simultaneously, the combination of sensor size and gas pressure/density was low enough such that most gamma-induced electrons produced only minimal energy deposition in a sensor.

The glass consisted of a modified fused silica with a low gas diffusion rate for $^3$He (estimated 90% retention for at least 30 years) and a resistivity of approximately $2 \times 10^{11}$ Ω·m. The resistivity value enabled conduction of charge reaching the interior sensor wall through the wall, thereby avoiding a saturation effect in which excessive charge buildup diminished the strength of the electric field in the sensor and consequently the neutron pulse amplitudes. (This effect is described later.) The dielectric constant of the glass and the sensor wall thickness compared to the total sensor size were such that when a potential voltage was placed across a sensor, most of the voltage drop occurred within the gas-filled region of the sensor, as opposed to the wall. Although the resistivity value was around $2 \times 10^{11}$ Ω·m in this particular case, it will be appreciated that the preferred value may vary based on sensor size and wall thickness, noise levels within the signal readout system, the maximum neutron count rate desired for a particular application and other factors. In many cases, a resistivity value between $10^9$ Ω·m and $10^{12}$ Ω·m is appropriate.

To operate a sensor, two electrodes 13 were placed next to it, one on each side of the sensor. To hold the sensor and electrodes in place, the sensor was sandwiched between two printed-circuit (PC) boards, with the electrodes mounted on the surface of each PC board that faced the sensor. A high-voltage power supply was used to apply a DC voltage to the electrodes 13. The anode was connected to an off-the-shelf preamplifier, shaping amplifier, and computer-based MCA card for capturing the pulse height spectrum from the sensor. Voltages between 20 V and 1000 V DC were applied to single sensors and to multiple sensors in parallel, creating an electric field across and through the sensor. The electric field was strong enough to sweep charge across the sensor gas to the interior sensor wall, but not strong enough to cause breakdown and continuous discharge of the gas.

When a neutron was captured by a $^3$He atom in a sensor, the reaction released 764 keV of energy, creating thousands of ionizations in the sensor gas. Under the influence of the electric field produced by the DC voltage applied to the external electrodes 13, the electrons and ions would move across gas-filled region of the sensor, traveling toward the portion of the interior sensor wall adjacent to the anode and cathode, respectively. The duration of charge flow across the sensor was in the microsecond range for the electrons and rather longer for the ions. This charge flow produced a pulse that was amplified and shaped by the preamplifier and amplifier and then sent as input into the MCA card, where pulses were collectively recorded and displayed on the computer as a pulse height spectrum. Because of the time constants in the preamplifier and amplifier and the relatively slow drift velocity of the ions in the gas as compared to the electrons, the neutron pulses were formed primarily by electron drift, causing them to appear as a broad shoulder in the pulse height spectrum.

Computer software was used to control the MCA card. A lower-level discriminator (LLD) was set such that the amplitude of most neutron pulses exceeded the LLD, causing them to be counted, while essentially all gamma pulses did not exceed the LLD and thus were not counted.

Sensors were mounted between parallel small PC boards in a sandwich configuration. Teflon nuts, bolts, and spacers were used to hold the PC boards apart at a fixed distance such that the dielectric sensor between them was held snugly in place with controlled mechanical pressure applied to it. Electrodes of various sizes between 0.24 mm and mm were used in various instances. Electrodes were located on the surface of each PC board in contact with the surface of the sensor. Lead wires were passed through holes in the PC boards and into contact with respective electrodes. A thin ring of insulating adhesive was applied around the edge where the sensor contacted the PC board to provide adhesion to help hold the sensor in place and to insulate the electrode from any conductive materials that might be inadvertently brought into its vicinity. Measured capacitances of the dielectric sensors were around 0.2 pF with electrodes attached after placement in the PC board structure.

Although the electrodes described in the foregoing example were configured as wires passing through holes in a PC board, it will be appreciated by those skilled in the art that there are many suitable means of creating the electrodes and applying them to the dielectric sensors. Some examples include: thin film metallizations, thick film metallizations, conductive polymers, conductive paints, flexible metal sheets, metallized dielectric sheets, and printed circuit boards.

Several factors help determine the range of sizes appropriate for dielectric sensors. An important consideration is the relationship between size and gas pressure. A discussion of some of the factors that should be considered as they relate to spherical sensors is as follows. As detailed in Table 2, preferred gas pressure decreases with increasing sensor size and vice versa. For a sensor of 0.1 mm diameter, gas pressure is preferred to be at least 83 atmospheres (atm) and no more than 13,000 atm, these values being based on calculations related to neutron reaction product transport and interaction in the sensor gas. Although the exact internal gas pressure a dielectric sensor can withstand varies greatly with sensor size, wall thickness, and wall composition, for most microspheres a pressure of 1000 atm or less is preferred based on mechanical strength. For this reason, a sensor size of 0.1 mm diameter or greater is preferred for spherical sensors. Another consideration is that for a case in which the electrodes are attached directly to the outer surface of the microsphere, capacitance per unit area of microsphere (e.g. given a fixed area of coverage by a layer of microspheres, such as one square centimeter) increases as the separation distance between the electrodes decreases. Because electronics noise increases and signal-to-noise ratio decreases as capacitance increases, this also places a lower limit on the preferred sensor size. On the other hand, there are factors that also limit preferred maximum sensor size. An example is that of pulse duration; the time it takes an electron to drift across the gaseous region in a dielectric sensor (assuming a fixed gas composition and electric field strength) increases in proportion to sensor size. The greater the drift time, the poorer the time resolution of the neutron detection event and the greater the potential for neutron detection pulses to overlap. Additionally, the larger the dielectric sensor, in general, the higher the voltage required to operate the sensor. An advantage of the dielectric sensor concept is the ability to operate successfully at low voltages (e.g. less than 100 V as described in Example 5). For a spherical dielectric sensor, a diameter of 30 mm or less is preferred based on the desire to keep neutron pulse duration short and applied voltage low. It will be appreciated that spherical dielectric sensors outside of this size range may also be able to function as neutron detectors if designed correctly; however, optimum performance will ordinarily be achieved by sensors falling within this size range. It will also be appreciated that dielectric sensors of other shapes (e.g. cylindrical sensors) may also be used and that their preferred size ranges may be different than those of spherical sensors.

As previously noted, if the working gas contains H or $^3$He, particularly at elevated pressure, it is imperative that the glass wall have low permeability in order to retain the gas for a reasonable time. This problem was recognized by Henderson et al. in U.S. Pat. No. 4,795,910, which teaches a completely different type of detector but notes that for good gas retention a composition having less than about 30 to 40 mol % of non-glass formers is preferred [Col. 4 lines 5-30]. The formulation of such glass compositions may be considered routine in the art.

However, for optimal performance of the detector described in the preceding examples, Applicants further discovered that the conductivity of the glass is important, because having some conductivity will allow the charges to equilibrate after the pulse has been detected. Many suitable dopants can be used to modify the electrical properties of glasses, and the formation of compositions having a particular combination of properties such as melting point, resistivity, etc. may also be considered routine in the art. It will therefore be appreciated that the glass composition may be selected from many suitable formulations. Applicants used a commercially-supplied proprietary glass as described in Table 3, the exact composition of which is not known to Applicants. Depending on specific operating requirements such as gas composition, working temperature, overall size, and various manufacturing considerations, a particular glass formulation can be developed for a particular application through routine experimentation. Applicants prefer that the glass has bulk resistivity in the range from about $10^8$ Ω·m to about $10^{17}$ Ω·m and a gas permeability constant for helium at room temperature of less than $7.6 \times 10^{-11}$ cm$^3$/sec/cm$^2$/mm/cm·Hg. More preferably, the glass has a bulk resistivity from about $10^9$ Ω·m to about $10^{13}$ Ω·m.

Applicants used gas-filled hollow glass spheres supplied by XL Sci-Tech, Inc., 3100 George Washington Way, Richland, Wash. 99354 as dielectric sensors. These glass spheres met requirements for electrical conductivity and gas permeability. Glass spheres of several different types were used, including a number using the XLS 5000 glass batch composition. Their characteristics are given in Table 3. The spheres had small "stems" (typically 5 mm long×2-3 mm diam) from the filling process, which were not found to be detrimental to the operation of the devices.

TABLE 3

Characteristics of commercially-obtained gas-filled glass spheres

| Glass Batch | ID # | Outer diameter (mm) | Wall thickness (mm) | He-3 pressure (atm) | Ar pressure (atm) | Ne pressure (atm) | Impurity level (ppm) |
|---|---|---|---|---|---|---|---|
| XLS5000 | XLS5003 | 6.9 | 0.25 | 3 | 5 | 0 | <5 |
| XLS5000 | XLS5005 | 7.0 | 0.25 | 3 | 5 | 0 | <5 |
| XLS5000 | XLS5006 | 7.0 | 0.25 | 3 | 5 | 0 | <5 |

TABLE 3-continued

Characteristics of commercially-obtained gas-filled glass spheres

| Glass Batch | ID # | Outer diameter (mm) | Wall thickness (mm) | He-3 pressure (atm) | Ar pressure (atm) | Ne pressure (atm) | Impurity level (ppm) |
|---|---|---|---|---|---|---|---|
| XLS5000 | XLS5007 | 6.8 | 0.25 | 3 | 5 | 0 | <5 |
| XLS5000 | XLS5009 | 6.8 | 0.25 | 3 | 5 | 0 | <5 |
| XLS5000 | XLS5010 | 6.8 | 0.25 | 3 | 5 | 0 | <5 |
| XLS5000 | XLS5012 | 6.8 | 0.25 | 3 | 5 | 0 | <5 |
| XLS5000 | XLS5014 | 6.8 | 0.25 | 3 | 5 | 0 | <5 |
| XLS5000 | XLS5015 | 6.9 | 0.25 | 3 | 5 | 0 | <5 |
| XLS5000 | XLS5016 | 6.8 | 0.25 | 3 | 5 | 0 | <5 |
| XLS5000 | XLS5017 | 6.9 | 0.25 | 3 | 5 | 0 | <5 |
| XLS5000 | XLS5020 | 7.1 | 0.25 | 3 | 5 | 0 | <5 |
| XLS5000 | XLS5021 | 7.1 | 0.25 | 3 | 5 | 0 | <5 |
| XLS5000 | XLS5023 | 7.0 | 0.25 | 3 | 0 | 9.8 | <5 |

Electric Field Strength and Distribution

A significant consideration in correct operation of the dielectric sensors is the strength and distribution of the applied electric field.

First, the strength of the electric field in the dielectric sensor should be such that the sensor operates below a Geiger-Mueller (G-M) mode; e.g. the ionization, proportional, or limited proportionality regions of gas gain. There are several reasons for this. First, of the different operating modes, G-M requires the strongest electric field (and therefore the highest voltage) and/or the lowest gas pressure (and therefore the lowest potential density of neutron target material if the target material is a gas), although these are only hindrances to optimal performance and do not in and of themselves preclude successful operation. Secondly, and more importantly, ionizations created in a gas-filled dielectric sensor will induce electron avalanches that continue to grow until such time as a sufficient number of positive ions have accumulated in the sensor to reduce the electric field strength below that needed for gas multiplication to continue. In this case, the relationship between the number of initial ionizations and the pulse amplitude is lost and pulse amplitude is no longer a useful guide to the number of ionizations created by a radiation particle in the dielectric sensor. This means that the ability to perform pulse height discrimination (via pulse height analysis) is lost and pulses from neutrons can no longer be effectively distinguished from gamma pulses, greatly reducing the neutron-gamma discrimination capabilities of the device and therefore its usefulness. As noted earlier, the micro void detector of Kocsis operated in a G-M mode, which severely limited its ability to detect neutrons without excessive gamma response.

Second, the electric field should be strong enough to move electrons across the sensor without too much loss to electronegative contaminants or electron-ion recombination. (Related to this, the gas in the sensor should not have an excessive level of electronegative species. Standard off-the-shelf research grade gases are normally suitable.) Also, because the electron drift time across a sensor varies with the electric field strength, any preamplifiers or amplifiers used in the signal readout electronics should have time constants appropriate to the electron drift time that results from the potential voltage applied across the sensor.

Third, the drop in potential voltage across the sensor should be a sufficiently large fraction of the total drop in the potential voltage between the electrodes that apply the electric field to that sensor. The reason for this is that the amplitude of the pulse seen by the electrodes is a function of both the amount of charge (ionizations) liberated in a sensor and the fraction of the total drop in potential voltage between the electrodes through which the charge moves. Thus, if the charge (particularly the electrons if the electronic time constants are such that electron drift produces most of the pulse) from a neutron interaction in a sensor only moves through a small fraction of the total voltage drop between the electrodes, the resulting pulse amplitude may be too small to be useful. (The minimum useful neutron pulse amplitude can vary with the electronics design, noise level of the system, gamma pulse amplitude distribution, and operating mode, such as being in the ionization or proportional regions of gas gain.) The sensor may have a shape such as a sphere that results in the voltage drop across the sensor gas varying with location. In such cases, the maximum (peak) voltage drop can be used as a guide to what is sufficient provided a substantial fraction of the sensor gas falls within a region having a voltage drop that is a reasonable fraction of the maximum voltage drop.

There are several aspects to ensuring that the voltage drop across the gas-filled interior of a sensor is sufficiently large relative to the total voltage drop across the electrodes. The first is the design of the sensor itself; in particular, the wall thickness relative to the total sensor size and the dielectric constant of the sensor gas and the sensor wall material. It is preferable to select materials and use wall thickness-to-sensor size ratios (given other considerations such as the wall thickness needed to provide sufficient mechanical strength and long-term retention of the contents of the sensor) that maximize the fraction of the voltage drop across the sensor that occurs within its interior. The second is the configuration of the electrodes relative to the sensor(s). Consider, for example, the case in which a sensor is placed between two electrodes. If there is a large gap between the electrodes and the sides of the sensor closest to them (see FIG. 1A), a substantial fraction of the total voltage drop between the electrodes will occur in the gaps between the electrodes and the sensor. The gap 14 may be vacuum, air or other gas, or filled with a dielectric material of appropriate resistivity and dielectric constant. On the other hand, if the electrodes 13 are in direct contact with the exterior of the sensor wall 11 (see FIG. 1B), the voltage drop will be concentrated across the sensor. If all other factors are held constant (e.g. sensor material type), the sensor shown in FIG. 1B will therefore produce larger pulses than the sensor shown in FIG. 1A. Similarly, if a plurality of sensors 10 are used in a device and they are placed in a layered fashion or in a random way such that there are multiple sensors located perpendicularly between the electrodes 13' (see FIG. 2 for two examples), the same effect occurs, with pulse amplitude decreasing due to a decreased fraction of the total voltage drop occurring across each individual sensor. This limits the number of sensor layers that can be stacked on top of each other or randomly distributed in a matrix 14' between two electrodes.

One of the deficiencies of prior art devices based on microspheres is that the number of microspheres, their size, and the spacing between the electrodes was such that if placed end-to-end, the microspheres would be stacked more than 13 layers deep between the electrodes; this was a major factor in limiting the amplitude of the neutron pulses to the extent that they were largely indistinguishable from noise on the basis of pulse amplitude alone.

Example 3

Figure 3:
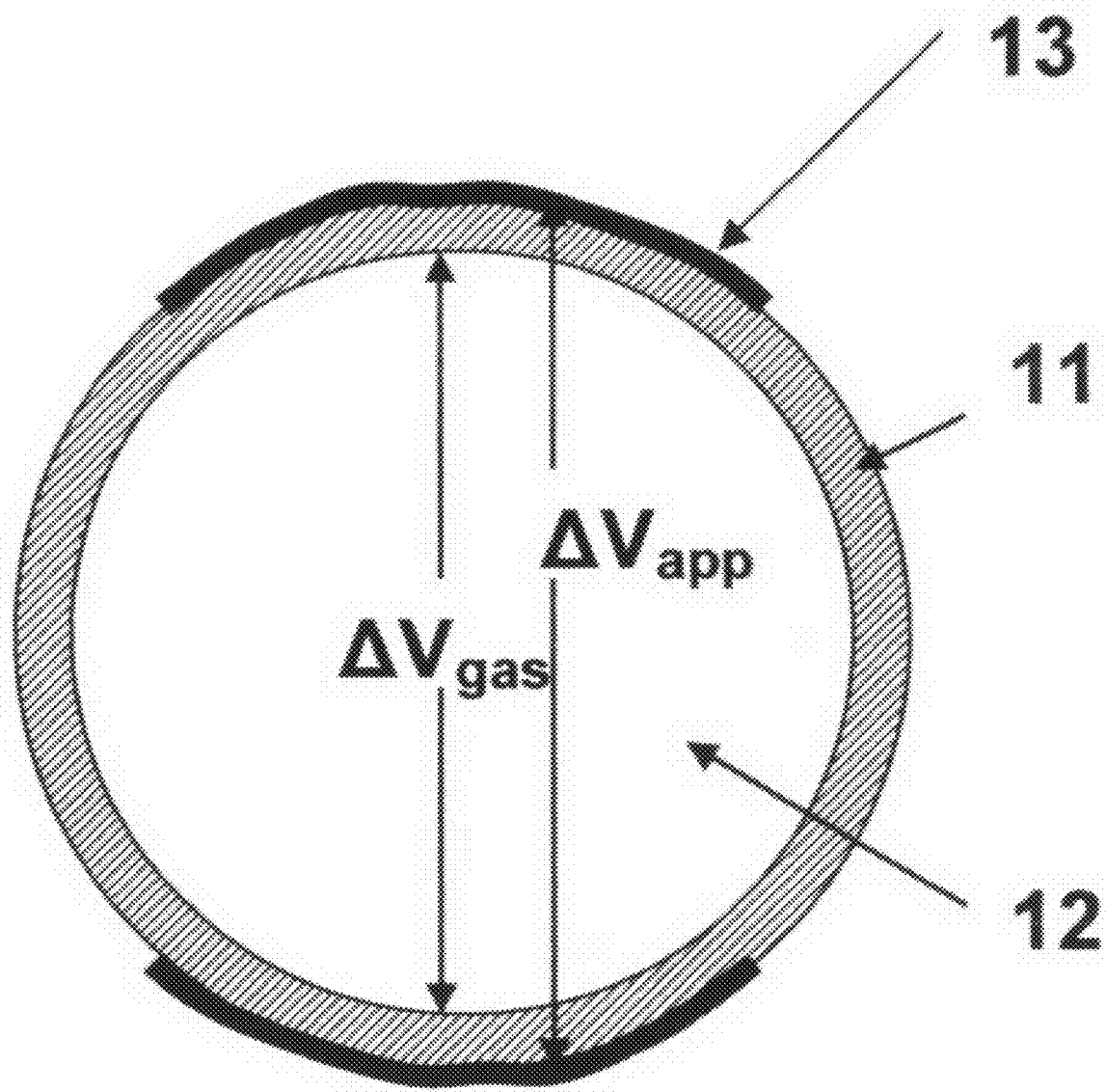
FIG. 3 is a schematic diagram in cross-section of a single balloon with external electrodes, showing voltage drops across the different components.
Figure 4:
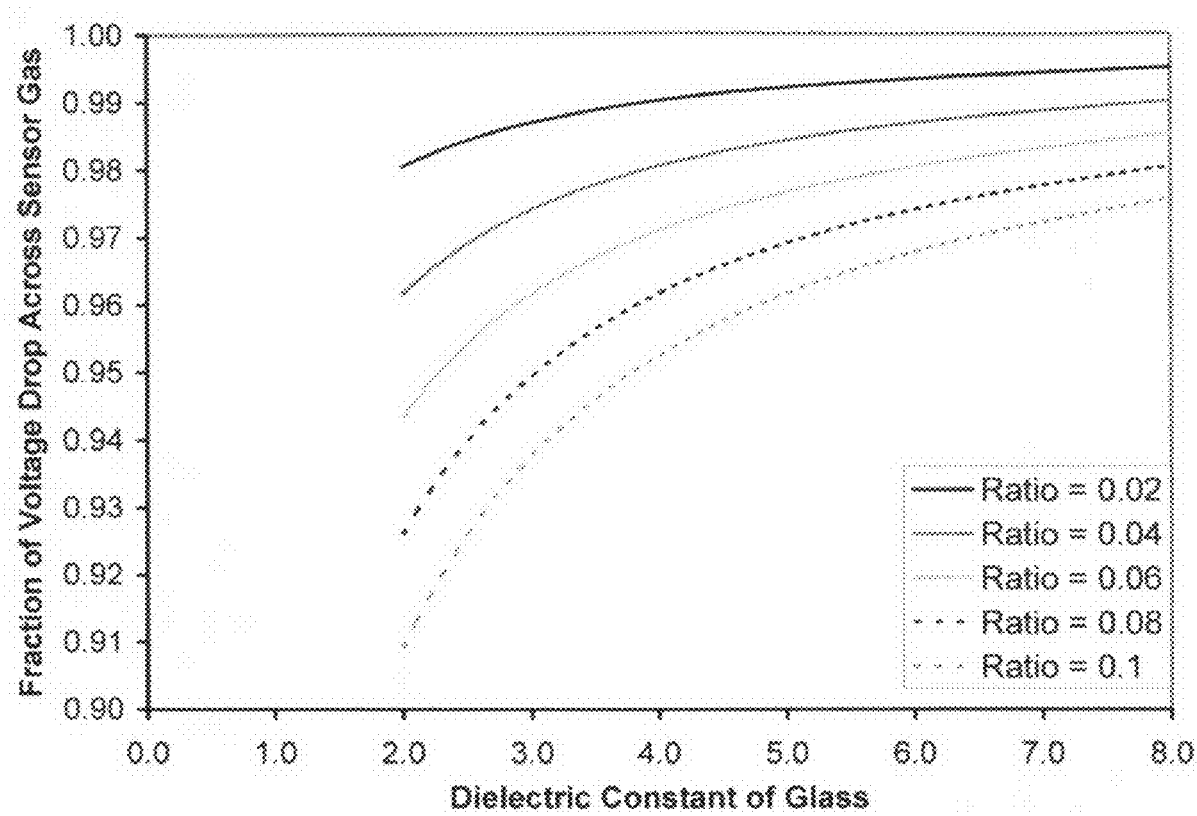
FIG. 4 is a plot of the fraction of the voltage drop across the interior gas as a function of the dielectric constant of the glass wall for various ratios of wall thickness to sphere diameter.

Assuming a spherical dielectric sensor filled with gas, the fraction of the voltage drop across the gas may be estimated by approximating the electrodes and sensor walls as parallel plates, using the formula:

$$\Delta V_{gas}/\Delta V_{app} = t/[(2t_w/k) + t],$$ [Equation 1]

where $\Delta V_{app}$ is the applied voltage across the electrodes, $\Delta V_{gas}$ is the drop in voltage across the sensor gas, k is the dielectric constant of the glass, $t_w$ is the wall thickness, and t is the inner circumference of the sensor. These parameters are depicted in FIG. 3. Sensor size and wall thickness may vary, but it can be seen in Equation 1 above that it is the ratio of these values, rather than their absolute values, that matters. Glass dielectric constant can also vary. FIG. 4 shows the fraction of the voltage drop occurring within the sensor gas as a function of glass dielectric constant for different total wall thickness to total sensor size ratios varying from 0.02 to 0.10. The plots cover various preferred ranges of size and wall thickness; for example, a 1 mm sensor with a 20 μm wall thickness has a ratio of 0.02, whereas a 1 cm sensor with a 1 mm wall thickness would have a ratio of 0.1. Note that typical glasses normally have dielectric constants between 4 and 10.

Several factors help determine the preferred range of wall thicknesses for dielectric sensors. Some of these factors are as follows and discussed particularly as they relate to spherical sensors. It is desirable that sensors be mechanically robust. For successful long-term operation, sensors should retain their gas fill and not have contaminants (e.g. electronegatives) diffuse into them that can negatively affect their operation. It is well known to those skilled in the art that mechanical strength and gas diffusion characteristics vary from one material to another. For a spherical glass dielectric sensor, the preferred minimum wall thickness is 10 μm based on these considerations. (The optimum thickness may be significantly more than this.) One of the factors affecting maximum preferred wall thickness is electric field distribution, as discussed earlier. As explained elsewhere, the maximum preferred size for a spherical dielectric sensor is 30 mm. For a sensor with a 30 mm internal diameter (i.e. the gas-filled inner portion of the sensor) and a wall thickness of 5 mm, the total outer diameter of the sensor will be 40 mm. In this case, the fraction of the voltage drop between the electrodes occurring within the gas would be sufficient to produce detectable neutron pulses. Thicker sensor walls could be used, although they would tend to diminish signal amplitude, increase the time required for a sensor to equilibrate following a neutron detection pulse, and could increase manufacturing cost. Note that sensor electrodes can, of course, be formed within the sensor wall. For example, a dielectric sphere with a wall thickness of 200 μm could have an electrode applied to it and then have an outer layer of dielectric material placed around it as another spherical layer of material. (The electrodes could be connected to a wire that passes through the outer layer of dielectric material.) This approach could be used to improve long-term gas retention and mechanical strength while keeping the thickness of material between the electrodes and the sensor gas comparatively low.

Applicants have discovered that as a result of the preferred range for sensor size and wall thickness (due to considerations such as electrical properties and mechanical robustness), the ratio of total wall thickness to sensor size (the sum of the distance across the interior cavity and the total wall thickness) will often fall within the range of 0.02 to 0.1. Data for a series of ratios between 0.02 and 0.1 are shown in FIG. 4. It will be appreciated that values outside of this range, such as ratios of 0.01 and 0.2, may be appropriate for some applications. It will also be appreciated that a sensor could be designed such that, while part of the sensor (e.g. the area around where the electrodes are located) has a ratio between 0.01 and 0.2, a portion of the sensor has a ratio outside this range.

Pulse Height Analysis and Differentiation of Neutrons from Other Pulse Sources

As explained earlier, a dielectric sensor designed according to the principles described in this patent will demonstrate a good ability to detect neutrons without excessive interference from gamma rays, thereby overcoming a shortcoming of many other types of radiation detectors. Also as explained earlier, these same principles, if followed, will lead to sensors in which the neutron pulses are, on average, of greater amplitude than the gamma pulses. Thus, pulse height analysis/pulse height discrimination can be used to separate neutron pulses from gamma pulses. This can be accomplished by setting the value of a lower level discriminator (LLD) such that neutron pulses predominate above the LLD and gamma pulses predominate below the LLD. (It will be appreciated that the predominance can be relative in some circumstances, such as in a case when very few neutrons are present, while a very great many gamma rays are.) Judicious selection of design parameters (e.g. size, shape, fill gas density) will yield sensors that maximize the ratio of average neutron pulse amplitude to average gamma pulse amplitude, producing a greater ability to distinguish between neutron and gamma pulses on the basis of pulse height discrimination, while simultaneously keeping most neutron pulses of sufficient amplitude to be readily detected (i.e., to be of greater amplitude than the baseline electronic noise of the system). Referring to Example 1 which describes a spherical gas-filled dielectric sensor, the use of a combination of sensor size (inner diameter) and gas density that falls within the preferred range as given in Table 1 will yield such a result.

Example 4

Figure 5:
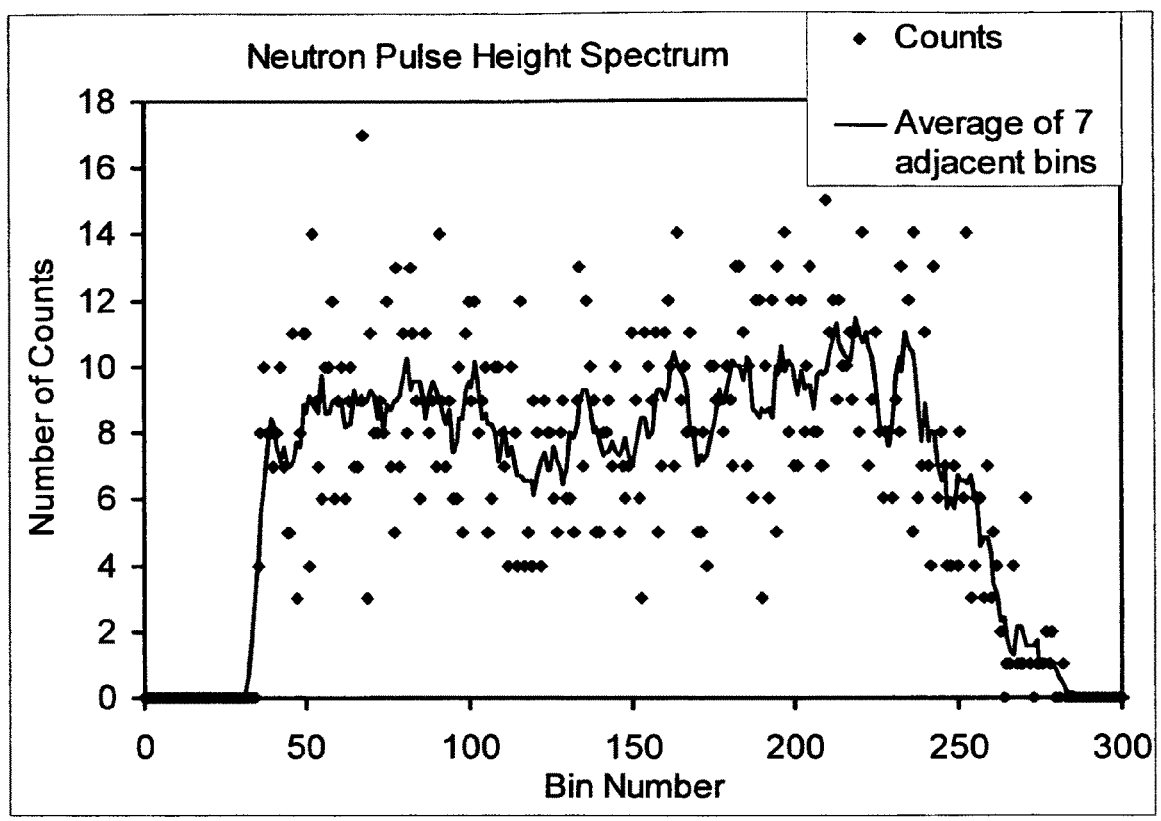
FIG. 5 is the pulse height spectrum obtained by exposing one embodiment of the inventive sensor to a neutron source.
Figure 6:
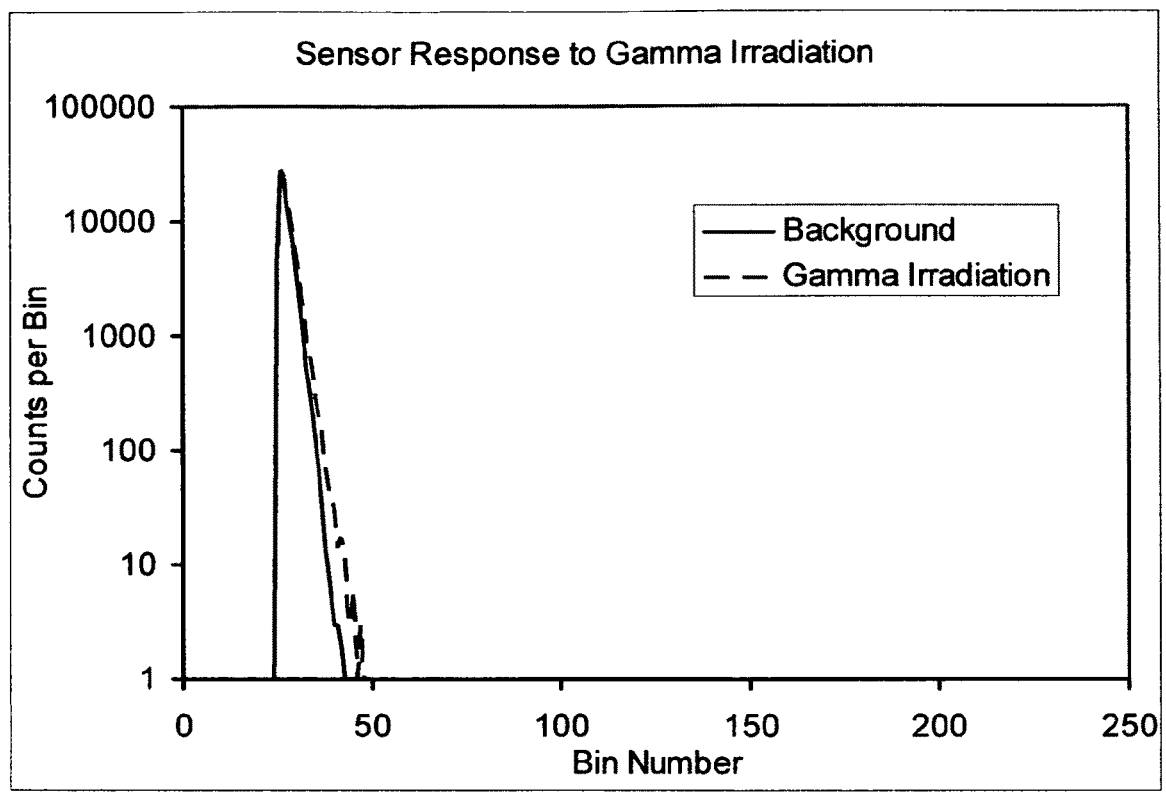
FIG. 6 shows the pulse height spectrum due to gamma and background noise for one embodiment of the inventive sensor.

A set of dielectric sensors of approximately spherical shape was constructed using a combination of size and gas density falling within the preferred range identified in Table 1. These sensors were exposed to neutrons from a $^{252}$Cf source and to gammas from a $^{137}$Cs source at a high dose rate (0.73 R/hr) and their pulse height spectra were recorded. FIG. 5 shows the pulse height spectrum for different counting times of the neutron case using an LLD set at Bin number 42. (Note that a small number of neutron counts did not exceed the LLD.) FIG. 6 shows the pulse height spectrum for background and the gamma case using an LLD set considerably lower to enable the baseline electronics noise to be seen. As is evident in the graph, the neutron pulses recorded in FIG. 5 are located above the baseline electronics noise seen in FIG. 6, meaning they can be distinguished from noise with a very high probability using an LLD. Of equally great interest, it is seen in FIG. 6 that gamma irradiation at a fairly high dose rate (0.73 R/hr) produced only a small response in the sensors; the baseline noise amplitude increased only slightly as low amplitude gamma pulses were superimposed on the electronics noise. Again, most neutron pulses were of greater amplitude than the baseline noise (including that from both the electronics and gammas), meaning they can be readily distinguished using pulse height discrimination.

Analysis of the data found a neutron-to-gamma sensitivity ratio of greater than $10^8$; in other words, given an equal number of neutron and gamma particles entering a sensor, the sensor would produce more than $10^8$ counts (from pulses exceeding the LLD) from neutrons for every one count from gammas. (This assumes an LLD set at Bin number 50.) The data shown in this example were taken using off-the-shelf electronics, including a preamplifier, amplifier, and computer-based MCA card.

As previously mentioned, a significant limitation of the Kocsis device was that the combination of glass microsphere size and fill gas pressure and composition was such that in most cases the fraction of the energy released by a neutron interaction that was deposited in the sensor gas was one percent or less. Since the Kocsis device was operated at a very high voltage (4500 V), there was a large gas gain in the microspheres which made the neutron pulses large enough to be detected by the signal readout system. An advantage of using a dielectric sensor design that results in a much larger fraction (on average) of the energy from a neutron interaction in the sensor (e.g. capture by a $^3$He atom) being deposited in the sensor gas is that the need for gas amplification (i.e. to make the neutron pulse amplitude big enough to exceed the LLD) in the sensor is thereby reduced or even eliminated, since the starting signal (the number of ionizations formed in the sensor gas) is much larger. This in turn enables the sensor to be operated at a lower voltage (assuming the design stays the same) or to be made larger and/or with a higher gas pressure (enabling greater neutron detection sensitivity). In general, lower voltages simplify the electronics requirements of a device, reduce its power draw, may reduce regulatory compliance requirements, and tend to increase its ruggedness.

Example 5

The pulse height spectrum of neutron pulses from the dielectric sensors described in Example 2 was measured as a function of applied voltage. It was determined that 100 V was sufficient to nearly maximize the neutron detection sensitivity and that a substantial neutron signal could be seen at only 20 V. This stands in contrast to most conventional gas-based neutron detectors (e.g. $^3$He and $BF_3$ tubes) that usually have an operating voltage in the neighborhood of 1000V and to the Kocsis device that operated at 4500 V. Further, Applicants postulate that much of the reduction in neutron detection efficiency below 100 V was due to the time constants in the signal readout electronics not being optimally matched to the duration of electron drift in the sensors; therefore, it is very likely that the sensors described in Example 2 could be operated with near maximal neutron detection efficiency at an applied voltage of 48 V and most likely significantly less. Additionally, sensors can be operated at a voltage less than that needed to maximize neutron detection efficiency. For example, sensors could be operated at a voltage at which half the neutrons are counted; such a detector would still be of use in a number of applications.

When operated at 20 V, the sensors, being about 7 mm diameter, had an electric field strength of approximately 30 V/cm. Under this condition, many neutron pulses were detected. Given a high gas purity, a moderate gas pressure, and signal readout electronics with appropriate time constants, one can anticipate that electric field strengths of 10 V/cm or less (corresponding to approximately 15 V for a 7 mm sensor) will produce some neutron counts from a sensor.

Figure 7:
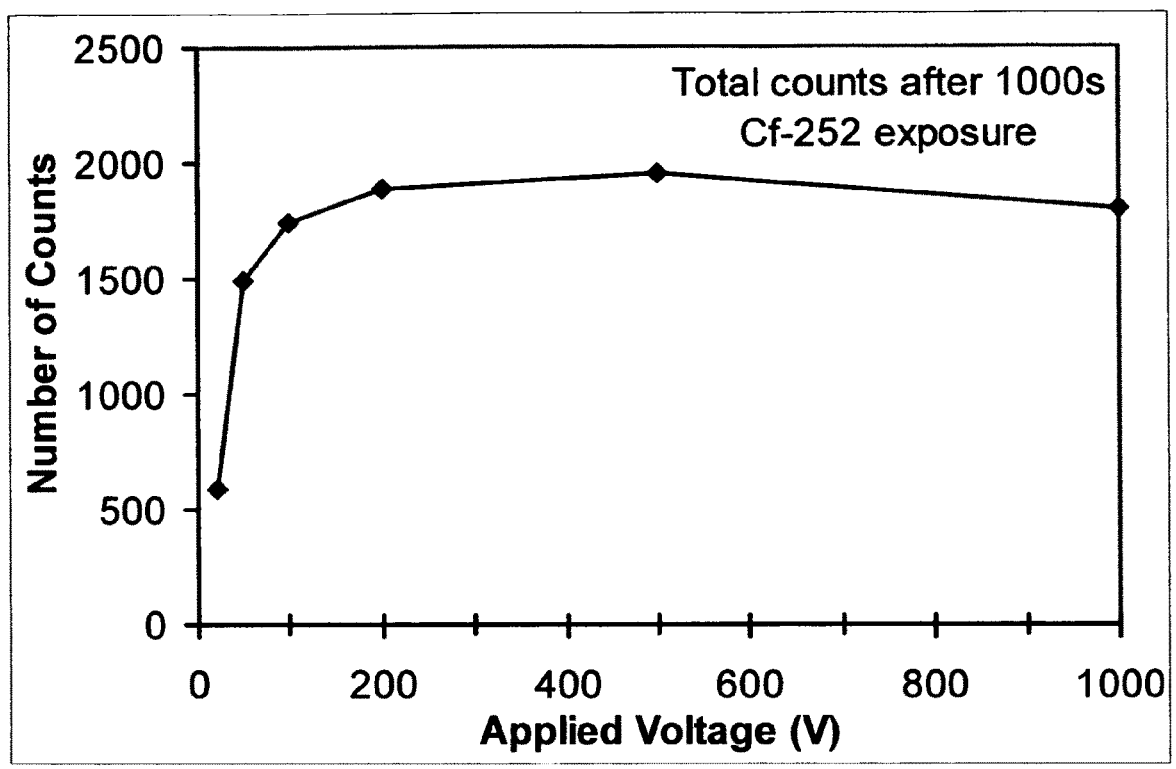
FIG. 7 shows the number of neutron counts recorded as a function of applied voltage over the range 0 to 1000 V.
Figure 8:
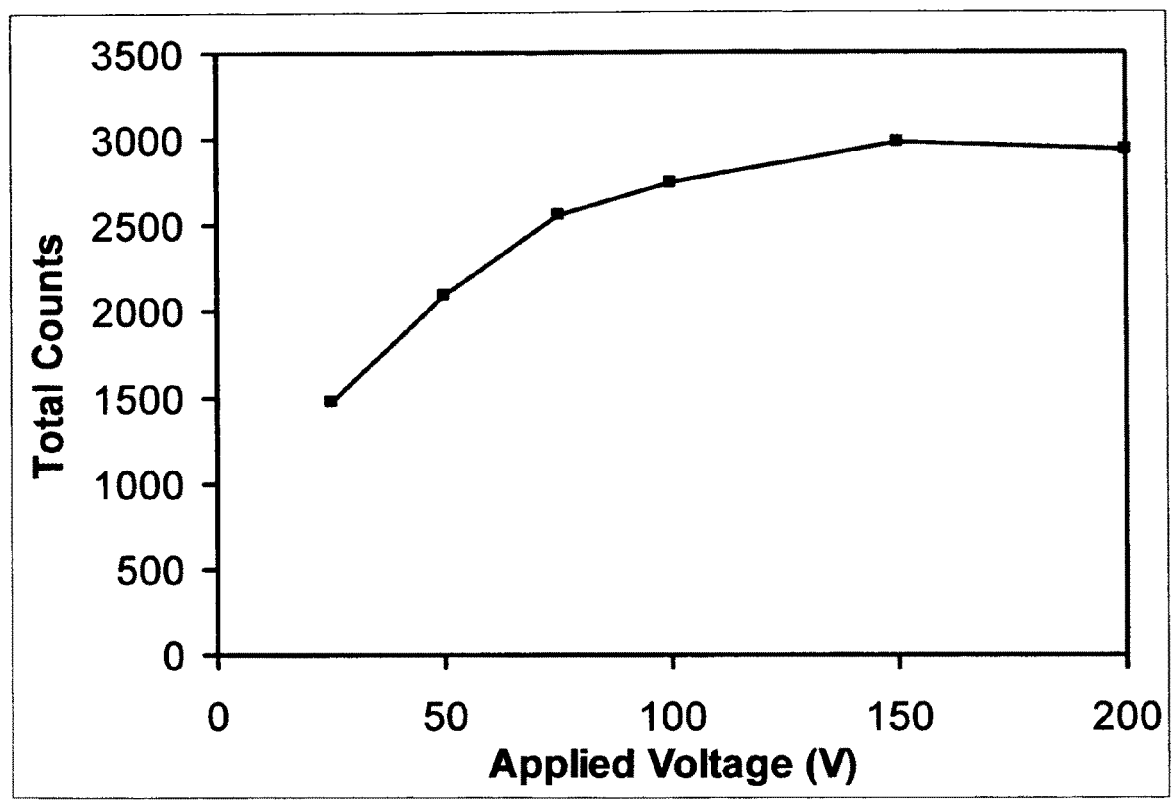
FIG. 8 shows the number of neutron counts recorded as a function of applied voltage over the range 0 to 200 V.

FIG. 7 shows the variation in number of neutron counts recorded per unit time with applied voltages between 0 and 1000 V and FIG. 8 shows the variation between 0 and 200 V. It is clear from the graphs that near optimal results can be obtained with surprisingly low voltages.

As noted earlier, the micro void detector of Kocsis was limited to some degree by the fact that the individual micro bubbles were very small and therefore could not be contacted by the external electrodes, because they were dispersed throughout a polymer matrix. In the present invention, the individual gas-filled balloons 10 are significantly larger (several mm vs 50 μm in Kocsis), which not only improves capture efficiency but also allows the balloons to be individually electroded. Depending on the demands of a particular application, arrays of these balloons may be configured in cylindrical or planar geometries (as well as others). As described in more detail in Applicants' co-pending application, the following example describes an embodiment of the present invention in which the gas-filled spheres of the previous example are built up with alternating layers of moderator material in a substantially planar geometry.

One common application in the neutron detection field is scanning of vehicles, cargo containers, and trains for nuclear weapons material using a portal monitor. In these applications, a neutron detector panel is typically used in the portal monitor, most often consisting of a layer of neutron detecting elements (e.g. $^3$He tubes) sandwiched between two layers of neutron moderating material (e.g. HDPE). This configuration is used because neutrons from materials of interest (e.g. Pu) are mostly emitted at fast energies (e.g. 100 keV to 20 MeV), while the neutron capture cross section for common neutron target materials (e.g. $^3$He, $^{10}$B) are often highest at thermal or near thermal energies (e.g. <1 eV); specifically, the moderating material is effective in slowing down the neutrons from fast to thermal energy so that their likelihood of interacting in a detection element and being detected is maximized. In present devices containing a layer of $^3$He tubes, the $^3$He tubes are frequently spaced apart from each other to form a non-contiguous layer (this cuts the cost of the device as the $^3$He tubes are expensive) and each tube is surrounded by a small, hollow cavity as this can boost neutron detection efficiency due to its neutronic properties.

Dielectric sensors may be employed in a similar fashion as conventional detectors such as $^3$He tubes in the way that they are distributed in the moderator. Further, because they are typically much smaller than $^3$He tubes ($^3$He tubes used in portal monitors are often one meter long, whereas dielectric sensors are usually cm or sub-cm in size), they may be distributed throughout a moderating matrix material with a much greater degree of freedom.

For a panel of one square meter (e.g. one meter wide by one meter high) consisting of dielectric sensors containing $^3$He or $^{10}$B neutron target material distributed in HDPE or similar material, the preferred total thickness of the panel is between 10 and 35 cm. (In some applications where form factor is an important constraint or there are other important tradeoffs related to size, the preferred range may change. Also, it is assumed that the panel is intended to detect neutrons being emitted next to the panel in a direction roughly perpendicular to the face of the panel, such as in the case of a truck or cargo container being scanned for nuclear weapons material while it sits next to the panel. If high bidirectional sensitivity is desired, such as the case when objects being scanned can sit on either side of the panel, the preferred range of thickness may be greater.) This range of thicknesses is preferred for several reasons. First, if the neutrons of interest are mostly fast neutrons, efficient moderation of the neutrons requires a certain amount of moderating material; this determines the preferred minimum thickness. Second, as a panel is made thicker, there comes a point of diminishing returns when additional increments of thickness begin to have little positive effect on the neutron detection sensitivity of the system, but only add extra bulk and cost.

A general principle in optimizing the design of a system, whether a panel or some other configuration, is that neutron detection sensitivity is maximized when the dielectric sensors are distributed throughout the volume of the moderating matrix material rather than being clustered in a small number of localized groups containing many sensors each. This is because the entire process of neutron moderation by the matrix material and capture by the dielectric sensors (e.g. capture by $^3$He or $^{10}$B neutron target material) is most efficient when the design of the device approaches a homogeneous state (i.e., one in which the neutron target material is thoroughly mixed throughout the moderating matrix material). It also has other advantages such as minimizing the average time between when a neutron enters the device and when it is captured and detected by a sensor.

A second general principle is that, given a fixed amount of neutron target material available for use in a device (neutron target material is usually expensive and the optimal price-performance of a device is usually achieved when the amount of neutron target material used is less than the amount that would maximize the neutron sensitivity of the device), neutron detection efficiency is maximized when the neutron target material is distributed in a non-uniform fashion in the moderator; in other words, although individual regions within the device may be very homogeneous, the concentration of neutron target material may vary from one region to another. Specifically, when neutron target material is at a premium, neutron detection efficiency is maximized by having the greatest concentration of neutron target material in the areas in which thermal neutron fluence is maximal. In this case, areas with low thermal neutron fluence contribute to neutron detection primarily due to their ability to thermalize or partially thermalize fast neutrons and either transmit or reflect them into regions with a higher concentration of neutron target material.

Example 6

Exemplary designs were simulated with MCNP to determine their neutron detection characteristics. The neutron source was assumed to be an unshielded plutonium spontaneous fission neutron source (producing mostly fast neutrons with an average energy of approximately 1 MeV) with the neutrons impinging the panel perpendicular to its face, and distributed randomly across the face of the panel. These simulations used spherical glass sensors of 7 mm outer diameter and 6.6 mm inner diameter (corresponding to actual sensors that were made and tested) containing $^3$He gas at various pressures between 0.3 and 30 atm. The panel was one meter wide and one meter high. An additional 10 cm of HDPE reflector was added to each side to increase neutron detection efficiency near the edge of the panel. The total panel thickness was 25 cm and consisted of solid HDPE with the dielectric sensors embedded inside. The sensors were arranged into layers; various numbers of layers between 3 and 13 were used. The sensors in each layer were non-contiguous, with center-to-center spacings between 0.72 and 2 cm. Sensor layers were spaced at various distances from the front of the panel into the HDPE.

The simulations determined that the following depths for the different sensor layer cases were near optimal: for 3 layers, 2, 5, and 9 cm; for 6 layers, 0.5, 2.5, 4.5, 7, 10, and 13.5 cm; for 13 layers, 0.5, 1.5, 2.5, 3.5, 4.5, 5.5, 6.5, 7.5, 8.5, 10, 11.5, 13, and 15 cm.

Tables 4-6 below list the neutron detection efficiency for these simulation cases. (It is assumed that if a neutron is captured by a $^3$He atom inside a dielectric sensor, it is detected. Detection efficiency is defined as the probability that a neutron entering the panel will be detected by a sensor.)

TABLE 4

Simulation results for three sensor layers

Neutron Detection Efficiency vs. Panel Design - 3 Sensor Layers

| Sensor Spacing (cm) | He-3 Pressure (atm) | | | | |
|---|---|---|---|---|---|
| | 0.3 | 1 | 3 | 10 | 30 |
| Fast Neutron Detection Efficiency | | | | | |
| 0.72 | 5% | 14% | 25% | 37% | 44% |
| 1 | 3% | 8% | 18% | 31% | 39% |
| 2 | 1% | 2% | 6% | 13% | 21% |
| Number of Liters of He-3 per 1 m$^2$ Detector | | | | | |
| 0.72 | 2.6 | 8.7 | 26.2 | 87.3 | 262 |
| 1 | 1.4 | 4.5 | 13.5 | 45.2 | 135 |
| 2 | 0.3 | 1.1 | 3.4 | 11.3 | 33.9 |

Number of Sensors per 1 m$^2$ Detector

| Sensor Spacing (cm) | Number of sensors is independent of sensor gas pressure |
|---|---|
| 0.72 | 59763 |
| 1 | 30000 |
| 2 | 7500 |

TABLE 5

Simulation results for six sensor layers

Neutron Detection Efficiency vs. Panel Design - 6 Sensor Layers

| Sensor Spacing (cm) | He-3 Pressure (atm) | | | | |
|---|---|---|---|---|---|
| | 0.3 | 1 | 3 | 10 | 30 |
| Fast Neutron Detection Efficiency | | | | | |
| 0.72 | 8% | 20% | 35% | 48% | 56% |
| 1 | 4% | 13% | 26% | 42% | 51% |
| 2 | 1% | 4% | 9% | 20% | 31% |
| Number of Liters of He-3 per 1 m$^2$ Detector | | | | | |
| 0.72 | 5.2 | 17.5 | 52.4 | 175 | 524 |
| 1 | 2.7 | 9 | 27 | 90.4 | 270 |
| 2 | 0.3 | 2.3 | 6.8 | 22.6 | 67.8 |

TABLE 5-continued

Simulation results for six sensor layers

Number of Sensors per 1 m² Detector

| Sensor Spacing (cm) | Number of sensors is independent of sensor gas pressure |
|---|---|
| 0.72 | 119526 |
| 1 | 60000 |
| 2 | 15000 |

TABLE 6

Simulation results for thirteen sensor layers

Neutron Detection Efficiency vs. Panel Design - 13 Sensor Layers

| | He-3 Pressure (atm) | | | | |
|---|---|---|---|---|---|
| Sensor Spacing (cm) | 0.3 | 1 | 3 | 10 | 30 |
| Fast Neutron Detection Efficiency | | | | | |
| 0.72 | 15% | 32% | 47% | 56% | 61% |
| 1 | 9% | 23% | 39% | 53% | 60% |
| 2 | 3% | 8% | 17% | 32% | 43% |
| Number of Liters of He-3 per 1 m² Detector | | | | | |
| 0.72 | 11.3 | 37.8 | 113.4 | 378 | 1134 |
| 1 | 5.9 | 19.6 | 58.9 | 196 | 588 |
| 2 | 1.5 | 4.9 | 14.7 | 49 | 147 |

Number of Sensors per 1 m² Detector

| Sensor Spacing (cm) | Number of sensors is independent of sensor gas pressure |
|---|---|
| 0.72 | 258973 |
| 1 | 130000 |
| 2 | 32500 |

It will be appreciated that the preferred design will depend to some degree on the contemplated use. For example, the preferred design of a panel for use in scanning vehicles will be quite different from the preferred design of a portable device for finding sources of unknown locations, due in part to the differences in possible directions of neutron travel and the neutron energy spectrum. Detector sensitivity can be optimized for neutrons of different energy ranges (e.g. fast neutrons from unshielded sources vs. a higher number of thermal neutrons from shielded sources) or the detector can be designed to have good detection performance for a wide range of neutron energies. Different applications will have different preferred points in the tradeoff between price and performance. Changes in design can encompass, but are not limited to, differences in geometry, materials, sensor design, signal readout system configuration and design, software and algorithms for data analysis and interpretation, and data display methods. The skilled artisan can adapt the present invention to particular applications through routine experimentation and optimization.

It will be appreciated that many suitable neutron moderating materials are known. One preferred material is HDPE, which is readily available and relatively inexpensive. Other polymers and polymer composites are also suitable and the polymers may further contain particulate materials or filler to further improve their neutron moderating capability or to tailor other engineering properties such as strength, density, optical opacity, and the like. In the foregoing example, it was contemplated that the individual layers of moderator material are substantially the same composition. In some applications it may be desirable to have different moderator materials in different areas of the detector assembly. This may be achieved by using sheets of different materials (in a planar geometry) or by using a monolithic functionally-graded moderator whose composition changes in one or more directions within the material.

It will also be appreciated that it may be desirable to include neutron absorber material in or around the device. As an example, assume a device consisting of dielectric sensors dispersed within a block of moderator. One can place a thin layer of neutron absorber with a high neutron capture cross section for thermal neutrons and a low capture cross section for fast neutrons (e.g. $^{10}$B, Cd, or Gd) across the outer surfaces of the device to reduce its response to thermal neutrons while retaining most of its response to fast neutrons. This is useful, for example, when it is desirable to detect an unshielded or lightly shielded fast neutron source, while reducing the response to background neutrons, many of which are thermal.

Example 7

The balloons (or gas-filled beads) of the previous Examples may be held in place in a generally flexible layer and the moderator material may likewise be flexible, allowing the entire assembly to be rolled into a generally cylindrical shape. Layers containing the balloons can be physically unattached to, or separable from, layers of moderator to enable disassembly of a relatively thick device into thinner constituent pieces that can be more easily rolled up or otherwise bent. The ability to roll or otherwise bend layers containing neutron-detecting balloons makes the device more readily portable than it would be were it in a rigid form.

It will be appreciated that the discrete neutron detecting elements may be individually addressable by the data collection system, or they may be ganged in parallel. If they are all substantially in parallel, electrical pulses will be collected without regard to which particular sensing elements detected the neutron, whereas if the elements are individually addressable some amount of position sensitivity can be obtained.

A consideration when designing a device containing a multiplicity of dielectric sensors is that in general it is preferable to avoid or to limit the extent of gamma ray-related crosstalk between individual dielectric sensors to prevent pulse summation that increases gamma ray sensitivity. As described earlier, correct design of a dielectric sensor will cause it to have inherently low gamma response. Nevertheless, the possibility remains that if multiple sensors are placed near each other, an electron from a gamma ray interaction may deposit energy in one sensor, thereby producing a pulse, before exiting the sensor and traveling into a second sensor, in which it may also deposit energy, producing another pulse. (This could happen repeatedly and a single electron could produce pulses in many sensors.) If some or all of the sensors thus affected were ganged together in parallel, their individual pulses from the gamma-induced electron would sum together to produce a larger pulse that could potentially be mistaken for a neutron. It is therefore desirable to minimize the likelihood of such an event occurring. Some approaches to accomplishing this are as follows.

One approach is to make the combination of travel distance and density of the intervening material between two sensors large enough to stop most electrons. The ranges of typical gamma-induced electrons from common gamma sources such as $^{137}$Cs or $^{60}$Co are generally less than 0.6 g/cm² (expressed as range [cm] per areal density of material). Using the sensor parameters given in Example 2 (spherical gas-filled glass dielectric sensor of 7 mm outer diameter and 6.6 mm inner diameter), it is seen that an electron must pass through a minimum of 0.1 g/cm$^2$ of material (assuming a glass density of 2.5 g/cc) just to exit through the wall of one sensor and enter through the wall of another. Sensors are usually spaced with an interstitial material (e.g. HDPE), which may add another 0.3 g/cm$^2$, assuming 1 cm center-to-center spacing. In this instance, the minimum total amount of material that must be passed through is 0.4 g/cm$^2$ and the average is much more than this because the direction of travel of the electrons is random. So in most cases, most electrons will be prevented from producing pulses in multiple sensors. In some cases, the sensor wall may be thinner, the electron energy greater (e.g. due to gamma ray energies being higher), sensor spacing distance smaller, or the sensor dielectric material less dense such that substantial numbers of electrons can deposit energy in multiple sensors. In most instances this will not produce sufficient gamma response to be of any practical concern because energy deposition by an electron in an individual sensor is very small (e.g. 10 keV) and even if such energy is deposited in several sensors (e.g. totaling 30 keV), it will still produce a trivially small pulse.

A second approach is to increase the spacing between the sensors and/or use a relatively dense material as an interstitial between the sensors. This will add to the areal density of material between the interior of one sensor and another, reducing or eliminating electron crosstalk between sensors.

A third approach is not to prevent crosstalk completely, but to limit the extent to which it contributes false signal artifacts. A first way to do this is to limit the number of adjacent sensors connected in parallel to a single signal readout channel, thereby reducing or eliminating the potential for pulses from different sensors to sum together in a single electronics channel. A second way is particularly applicable to the case where sensor wall thicknesses are small (e.g. when total sensor size is small). Since eliminating summation of pulses from an electron in a single electronics channel may not be possible, one approach is to maximize the fraction of electron energy deposited in the sensor walls and any material between the sensors. In practice this means making the areal density of the sensor walls and intervening material along an electron travel path a large fraction of the total areal density of material through which the electron moves. This may be accomplished through materials selection, sensor spacing, and sensor size.

Another type of crosstalk is the propagation of a signal from one sensor into adjacent sensors. In the Kocsis device, a discharge in a single microsphere produced a discharge in adjacent microspheres that eventually spread throughout the entire device [see M. Kocsis, "Micro Void Neutron Detector," presented at Joint Meeting on Neutron Optics and Detectors, Tokyo, Japan, 12-16 Jan. 2004.] In other words, ionization by a radiation particle in one microsphere produces a G-M discharge in that microsphere, changing the electric field strength in adjacent microspheres (that did not have any ionizations produced in them by the radiation particle) and causing G-M discharges to occur in them. The microspheres that are induced to discharge by the original microsphere that actually detects the radiation particle in turn also cause their neighboring microspheres to discharge, and thus the discharge spreads throughout the entire device without regard to the original microsphere that actually detected the radiation particle. This type of crosstalk has several negative effects on performance; it reduces or eliminates the possibility of position-sensitive neutron detection, increases power consumption, limits the maximum count rate of the device, and reduces the time resolution for neutron detection events. This type of crosstalk can be avoided by following the design and operational principles described above; in particular, by operating in a mode well below G-M (e.g. in ionization or proportional mode) and by not having an excessively large number of layers of sensors stacked on top of each other between a single set of electrodes.

Example 8

Using gas-filled balloon dielectric sensors as described in Example 2, an array containing nine sensors in parallel was constructed and connected to a single preamp and associated signal readout system. The nine sensors were arranged in a square pack (3×3 configuration, one deep) with a center-to-center spacing of 1 cm (sensors were 7 mm diameter), with the gaps between them filled with air. Voltages between 20 and 1000 V were applied to the sensors, causing them to operate in an ionization mode.

The dielectric neutron sensors described in the present invention have a unique set of attributes and design parameters that are not found in the prior art. For example, merely locating the electrodes externally on a dielectric body will not necessarily produce a working or practical device. Applicants have discovered that It is important that various attributes and design parameters fall within certain ranges and have certain relationships with each other in order for sensors to operate correctly. The correct combination of properties discovered in Applicant's research gives unexpectedly good results, as verified by experimental testing.

As mentioned elsewhere, a number of different electronic components may be used in the signal readout system. Such components include (but are not limited to) preamplifiers, amplifiers, pulse height analyzers, pulse detectors, linear amplifiers, shaping amplifiers, multichannel analyzers, lower level discriminators, pulse shape discriminators, lower level discriminators (LLDs), counters, timing circuits, and ASICs (application-specific integrated circuits) or other ICs (integrated circuits), including ASICs and ICs that combine multiple instances of a particular type of component and/or multiple types of components. Various types of amplifiers, such as preamplifiers, amplifiers, linear amplifiers, and shaping amplifiers, may be used to pick up the signal from a sensor or group of sensors, amplify the signal, and perhaps change the shape of the signal, thereby making it more suitable for processing or analysis by other electronic components. Pulse height analyzers, multichannel analyzers, and LLDs may be used to determine the amplitude of a pulse and/or the significance of a pulse based on its amplitude and to perform an action, such as binning the pulse into a histogram based on its amplitude or accepting or rejecting a pulse based on its amplitude. Similarly, pulse shape analyzers may be used to determine whether or not a pulse is significant and/or to bin the pulse based on its shape characteristics. This function may be used to distinguish between noise and legitimate pulses and/or to differentiate between pulses from different types of radiation (e.g. electrons and neutrons), as, depending upon sensor design and operation, there may be differences in typical pulse shapes from neutrons and gammas. (It is usually the case that gamma-induced electrons are much more sparsely ionizing than neutron reaction products; this can change the shape of pulses from these particles when a sensor pulse is generated primarily or wholly by electron drift due to the difference in spatial distribution of ionizations in the sensor gas and consequent differences in electron drift over time.) Timing circuits may be used to determine the time at which a neutron detection event occurred; this is of interest in applications such as neutron scattering and active interrogation, in which the arrival time of neutrons at the detector can provide valuable information. Basic principles of pulse amplification, shaping, amplitude measurement, binning, counting, time stamping, and the like are well understood by those skilled in the art.

Figure 2:
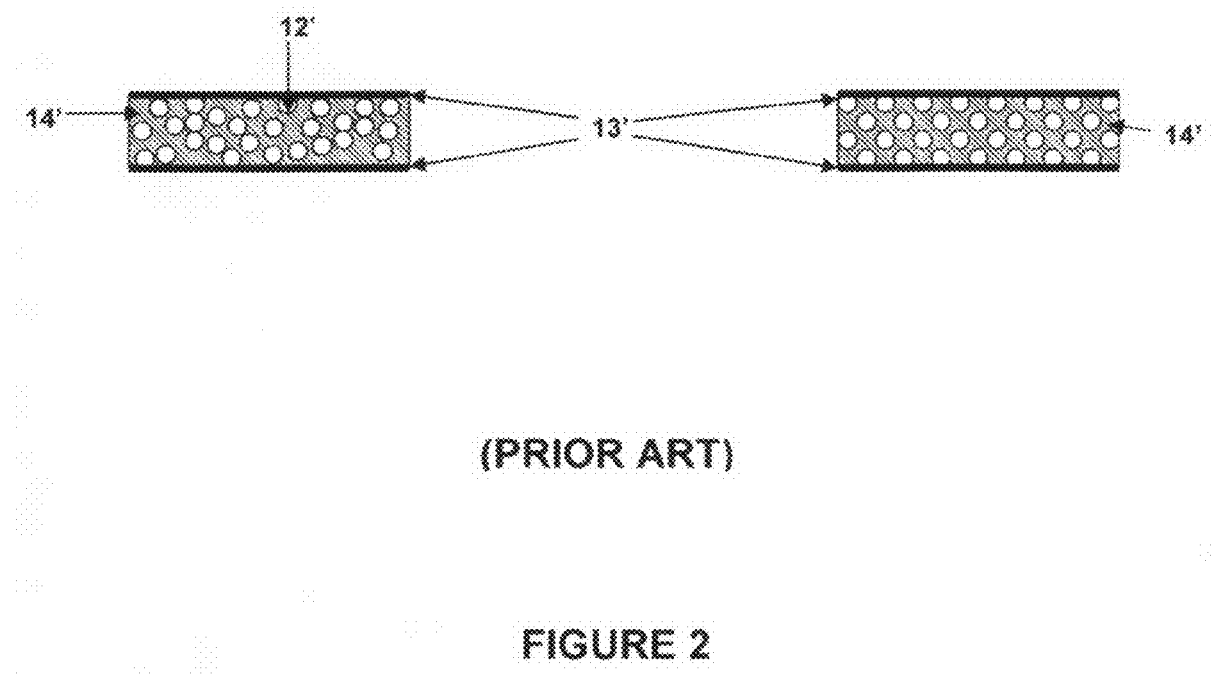
FIG. 2 is a schematic diagram in cross-section of two configurations of gas-filled dielectric balloons dispersed in a dielectric matrix with external electrodes.

Although FIGS. 1, 2, and 3 depict substantially spherical shaped sensors, the inventive sensors are not limited to spherical shapes. It will be appreciated that gas-filled dielectric sensors of a variety of different shapes may be used. Some examples of possible shapes include tubes, cubes, ellipsoids, polyhedral shapes, etc.

In summary, the gas-filled balloons of the present invention provide a number of significant performance advantages over previously disclosed devices. Some of these advantages are the following: First, operation in an ionization, proportional, or limited proportional mode allows neutrons to be distinguished from gamma rays. Second, the fraction of the total voltage drop across the (external) electrodes that occurs within individual sensor elements is sufficiently large to generate a substantial pulse amplitude; this necessary fraction varies with the Q value of the neutron reaction (e.g. $^3$He vs U neutron target material). Third, the composition of the glass micro balloon allows it to retain the neutron target material (this is primarily of interest when using H and $^3$He as the neutron target material). Fourth, the field distribution and mode of operation enable the device to operate at relatively low voltage. Fifth, the volume of the individual micro balloon is sufficiently large relative to the mean free paths of the reaction products created by a typical neutron interaction, that enough neutron energy is captured to create a useful pulse amplitude.

We claim:

1. An apparatus for detecting neutrons comprising:
   a hollow dielectric body having a bulk resistivity in the range from about $10^8$ to about $10^{17}$ $\Omega$-m, said body containing an interior volume of gas capable of at least partial ionization by a neutron;
   two electrodes in contact respectively with opposite sides of said dielectric body, said electrodes configured on the outside of said dielectric body to create an electric field across said gas volume, where the peak voltage drop across said interior volume of said hollow dielectric body is at least 70% of the bias voltage applied between said electrodes, so that an electrical pulse may be detectable by said electrodes when an ionization event occurs within said interior volume; and,
   a detection circuit connected to said electrodes, said detection circuit capable of detecting said electrical pulse.

2. The apparatus of claim 1 wherein said dielectric body comprises a generally spherical sealed glass capsule having an outside diameter between about 0.1 and 30 mm and a wall thickness between about 10 μm and 5 mm.

3. The apparatus of claim 2 wherein the ratio of said a wall thickness to said outside diameter of said hollow dielectric body is between 0.02 and 0.2.

4. The apparatus of claim 2 wherein said dielectric body has an outside diameter between 5 and 12 mm and a wall thickness between 0.05 and 0.4 mm.

5. The apparatus of claim 2 wherein the product of the diameter of said dielectric body and the density of the gas contained within said dielectric body (the areal density) is between $1.29 \times 10^{-4}$ and 1.07 g/cm$^2$.

6. The apparatus of claim 1 wherein said dielectric body has a bulk resistivity between $10^9$ and $10^{13}$ $\Omega$-m.

7. The apparatus of claim 1 wherein said dielectric body has a bulk resistivity around $2 \times 10^{11}$ $\Omega$-m.

8. The apparatus of claim 1 wherein said maximum voltage drop across said interior volume of the dielectric body is at least 90% of said bias voltage.

9. The apparatus of claim 1 wherein said electric field is below the field necessary to cause operation in a Geiger-Mueller mode and said electric field is sufficient to detect ionization events in a mode selected from the following group: ionization mode; proportionality mode; and limited proportionality mode.

10. The apparatus of claim 1 wherein said dielectric comprises a glass having a gas permeability constant for helium at room temperature of less than $7.6 \times 10^{-11}$ cm$^3$/sec/cm$^2$/mm/cm Hg.

11. An apparatus for detecting neutrons comprising:
    a plurality of neutron sensors comprising hollow dielectric bodies having a bulk resistivity in the range from about $10^8$ to about $10^{17}$ $\Omega$-m, said dielectric bodies filled to a selected pressure with a gas capable of at least partial ionization by a neutron;
    electrodes disposed on the external surfaces of said dielectric bodies and configured to establish an electric field within the interior volumes of said dielectric bodies, where the peak voltage drop across the interior volume of each of said sensors is at least 70% of the bias voltage applied between the electrodes, so that an electrical pulse may be collected in response to said ionization produced by an interaction of said neutron;
    a volume of moderator material in which said neutron sensors are placed, said moderator material having a front surface, wherein some of said neutron sensors are placed closer to said front surface than are others; and
    a detection circuit connected to said electrodes, said detection circuit capable of detecting said electrical pulse.

12. The apparatus of claim 11 wherein said hollow dielectric bodies comprise generally spherical sealed glass capsules having an outside diameter between about 0.1 and 30 mm and a wall thickness between about 10 μm and 5 mm.

13. The apparatus of claim 12 wherein the ratio of said a wall thickness to said outside diameter of said hollow dielectric body is between 0.02 and 0.2.

14. The apparatus of claim 11 wherein the product of the size of said dielectric bodies in at least one dimension and the density of the gas contained within said dielectric bodies (the areal density) is between $1.29 \times 10^{-4}$ and 1.07 g/cm$^2$.

15. The apparatus of claim 11 wherein at least some of said hollow dielectric bodies are individually addressable by said electrodes.

16. The apparatus of claim 11 wherein at least some of said hollow dielectric bodies may be addressed in parallel by said electrodes.

17. A method of making a neutron detector comprising the steps of:
    formulating a glass composition having a bulk resistivity in the range of $10^8$ to $10^{17}$ $\Omega$-m and a gas permeability constant for helium at room temperature of less than $7.6 \times 10^{-11}$ cm$^3$/sec/cm$^2$/mm/cmHg;
    forming said glass into a hollow body having a selected interior dimension from about 0.1 to about 30 mm and a wall thickness from about 10 μm to about 5 mm, wherein the ratio of said wall thickness to said interior dimension is between 0.02 and 0.2;
    filling said body with a gas composition at a selected pressure, said gas composition capable of at least partial ionization by a neutron;

sealing said body to retain said gas; and,
applying two electrodes on opposite sides, respectively, of said hollow glass body, said electrodes configured to apply a selected bias voltage to said hollow glass body, wherein the peak voltage drop across said selected interior dimension of said hollow body is at least 70% of said selected bias voltage.

18. The method of claim 17 further comprising the step of:
placing a plurality of said electroded hollow glass bodies within a volume of moderator material.

19. The method of claim 18 wherein said moderator material has a front surface, and some of said electroded hollow glass bodies are placed closer to said front surface than are others.

20. The method of claim 18 wherein at least some of said plurality of electroded hollow glass bodies may be individually addressable by said electrodes.

* * * * *